(12) United States Patent
Bassi et al.

(10) Patent No.: US 12,455,960 B2
(45) Date of Patent: Oct. 28, 2025

(54) APPARATUSES, COMPUTER-IMPLEMENTED METHODS, AND COMPUTER PROGRAM PRODUCTS FOR MANAGING INITIATION OF AN AUTOMATED HEALING PROCESS FOR OPERATIONAL TECHNOLOGY DEVICES IN A NETWORK

(71) Applicant: Honeywell International Inc., Charlotte, NC (US)

(72) Inventors: Atul Bassi, Bengaluru (IN); Tarun Gupta, Bengaluru (IN); Anubhav Misra, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 339 days.

(21) Appl. No.: 18/055,108

(22) Filed: Nov. 14, 2022

(65) Prior Publication Data
US 2024/0160730 A1    May 16, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .................. G06F 21/554; G06F 2221/034
See application file for complete search history.

(56) References Cited

U.S. PATENT DOCUMENTS

| | | | |
|---|---|---|---|
| 11,503,061 B1* | 11/2022 | Lin | H04L 63/102 |
| 2006/0191012 A1* | 8/2006 | Banzhof | G06Q 10/06311 726/25 |
| 2009/0196186 A1* | 8/2009 | Lidstrom | H04L 41/14 370/241 |
| 2013/0204821 A1* | 8/2013 | Keith, Jr. | G06F 11/26 706/46 |
| 2019/0188380 A1* | 6/2019 | Sandu | G06F 21/568 |
| 2020/0184847 A1* | 6/2020 | Gabay | G09B 19/0053 |
| 2020/0244673 A1* | 7/2020 | Stockdale | H04L 41/14 |
| 2023/0208848 A1* | 6/2023 | Fainberg | H04L 63/101 726/3 |
| 2023/0247051 A1* | 8/2023 | Mutairi | H04L 63/1483 726/12 |
| 2024/0064174 A1* | 2/2024 | Molzon | G06F 21/604 |

* cited by examiner

*Primary Examiner* — Tod R Swann
*Assistant Examiner* — Daniel Elahian
(74) *Attorney, Agent, or Firm* — ALSTON & BIRD LLP

(57) ABSTRACT

Embodiments of the present disclosure provide for improved methodologies for managing initiation of an automated healing process for operational technology devices in a network. Some embodiments include identifying at least one operational technology (OT) device connected to a network that is vulnerable to at least one cybersecurity risk, where the at least one OT device is wirelessly connected to the network, identifying at least one computer-executable resolution to the at least one cybersecurity risk, executing a simulation that tests performance of the network with resolution of the at least one cybersecurity risk utilizing the at least one computer-executable resolution, generating a solution implementation report based at least in part on the simulation, and determining whether to automatically initiate the at least one computer-executable resolution based at least in part on the solution implementation report.

19 Claims, 14 Drawing Sheets

| Sr. No. | Vulnerability | Severity | Possible Causes | Potential Impact | Recommended Solutions | Mitigation |
|---|---|---|---|---|---|---|
| 1 | Patch Definitions Out of Date Patch Definition File Age: Unknown, a Patch Definition File has not been loaded | High | The latest patch definitions from OT Solutions Vendor have not been imported into the Asset. The OT Solution vendor approved patch definitions should be imported monthly. | Patches on the system may be incorrectly classified. OT Vendor Solutions will not alert on newly released patches that are missing from monitored assets. | The latest Patches.xml file Updates in Database from OT Vendors. | Automated — 702 |
| 2 | DAT File Out of Date Antivirus definition files are out of date. | High | This asset has not had its definition files updated recently, or an attempt to update them has failed | This asset will be vulnerable to new attacks not covered by the old definition files. | Ensure that antivirus definitions are up to date in Database. | Automated — 704 |
| 3 | Active, Unused Port Detected: One or more interfaces of this network asset are administratively enabled but are not being used. Severity | High | If "down": 0 The network interface has been disabled. Connected asset(s) have been removed or disconnected. A network connection has been damaged or disabled. If "up": 1 new network interface has been enabled and is receiving traffic. | If "down": The loss of network connectivity could result in the failure of applications or services that rely on network communications. If "up": Could indicate the presence of an unauthorized or "rogue" asset. | Investigate the new connection. If the asset is unauthorized, monitor traffic on the new interface. Capture traffic for forensic analysis. | Manual — 706 |

| 7 | AV Warning: An antivirus warning event occurred. | Medium | Typically, information related to the Operational aspects of AV detection | AV may not be fully operational and possibly further documentation of actions taken relative to detected threats | Review AV event to determine what configuration settings need to be changed, access granted, etc | Manual — 708 |

FIG. 7

APPARATUSES, COMPUTER-IMPLEMENTED METHODS, AND COMPUTER PROGRAM PRODUCTS FOR MANAGING INITIATION OF AN AUTOMATED HEALING PROCESS FOR OPERATIONAL TECHNOLOGY DEVICES IN A NETWORK

BACKGROUND

Industrial systems often include network(s) having any number of connected devices. Such devices may include operational technology devices that facilitate monitoring and/or control of operational processes. Such devices may be connected wirelessly or via wired connections. These devices may communicate with one another over the network for use in maintaining operational efficiency and accuracy of industrial processes associated with the industrial system. Maintaining security of the network and devices connected thereto is important for maintaining robust operational functionality of the industrial system.

Applicant has discovered problems with current implementations of managing such devices and networks against cybersecurity risks. Through applied effort, ingenuity, and innovation, Applicant has solved many of these identified problems by developing embodied in the present disclosure, which are described in detail below.

BRIEF SUMMARY

In one aspect, a computer-implemented method for managing initiation of an automated healing process for operational technology devices in a network is provided. The computer-implemented method is executable via one or more computer(s), device(s), processor(s), and/or the like embodied in hardware, software, firmware, and/or any combination thereof. An example computer-implemented method includes identifying at least one operational technology (OT) device connected to a network that is vulnerable to at least one cybersecurity risk, where the at least one OT device is wirelessly connected to the network, identifying at least one computer-executable resolution to the at least one cybersecurity risk, executing a simulation that tests performance of the network with resolution of the at least one cybersecurity risk utilizing the at least one computer-executable resolution, generating a solution implementation report based at least in part on the simulation, and determining whether to automatically initiate the at least one computer-executable resolution based at least in part on the solution implementation report.

The computer-implemented method may also include where the computer-executable resolution includes updating at least one configuration of one or more device, where the one or more device is of the at least one OT device and/or the network, and where the configuration is a setting of the one or more device, updating at least one configuration of the one or more device of the at least one OT device and/or the network, where the configuration is a patch version of an application executed by the one or more device, isolating the one or more device from the network, and/or removing at least one portion of code from the one or more device.

The computer-implemented method may also include where determining whether to automatically initiate the at least one computer-executable resolution based at least in part on the solution implementation report includes determining that the solution implementation report indicates that the at least one computer-executable resolution is to be performed, and the computer-implemented method further includes automatically executing the at least one computer-executable resolution.

The computer-implemented method may also include where determining whether to automatically initiate the at least one computer-executable resolution based at least in part on the solution implementation report automatically determining that the solution implementation report indicates that the at least one computer-executable resolution should not be performed, and the computer-implemented method further includes automatically causing rendering of an alert includes an indication of the at least one computer-executable resolution for manual review.

The computer-implemented method may also include where the simulation generates criticality indication data indicating whether the at least one computer-executable resolution affects at least one critical component in a critical manner, at least one critical component in a non-critical manner, at least one non-critical component in a critical manner, and/or at least one non-critical component in a non-critical manner, where the solution implementation report is generated based at least in part on the criticality indication data.

The computer-implemented method may also include where identifying the at least one OT device that is vulnerable to the at least one cybersecurity risk includes detecting at least one malicious action attempted via the at least one OT device.

The computer-implemented method may also include where the computer-implemented method is performed via at least one processor disposed in an L3 layer of the network.

The computer-implemented method may also include where identifying the at least one OT device that is vulnerable to the at least one cybersecurity risk includes capturing at least one message communication transmitted over the network, and identifying the at least one cybersecurity risk by processing the at least one message communication.

The computer-implemented method may also include where determining whether to automatically initiate the at least one computer-executable resolution based at least in part on the solution implementation report includes causing rendering of an alert to an administrator device associated with the network, where the alert includes at least an indication of the solution implementation report, receiving an action response to the alert, and automatically initiating the at least one computer-executable resolution in response to the action response.

The computer-implemented method may also include where determining whether to automatically initiate the at least one computer-executable resolution based at least in part on the solution implementation report includes causing rendering of an alert to an administrator device associated with the network, where the alert includes at least an indication of the solution implementation report, receiving an action response to the alert, and disregarding the at least one computer-executable resolution in response to the action response.

The computer-implemented method may also include where identifying the at least one OT device that is vulnerable to the at least one cybersecurity risk includes receiving at least one structured log associated with at least one configuration of at least one device on the network, and identifying the at least one cybersecurity risk affecting the at least one OT device by processing the at least one structured log, as described herein. In some embodiments, the apparatus 200 detects one or more data-driven event(s) and/or trigger(s) indicating the at least one cybersecurity risk. For example, in some embodiments, the apparatus 200 detects at least one of anomaly traffic, anomaly behavior, malware present in the network, and/or the like that indicates a cybersecurity risk or a deviation in expected behavior based at least in part on historical or a baseline configuration, operation of the network and/or device(s), and/or the like.

The computer-implemented method may also include where identifying the at least one OT device that is vulnerable to the at least one cybersecurity risk includes detecting at least one incident representing attempted unauthorized access to the at least one OT device, anomaly behavior performed associated with the at least one OT device after the at least one OT device gains access to the network, anomaly traffic in inbound and/or outbound access to the network, existence of a connection of at least one untrusted device on the network, an internal threat to the network, or malware present in the network.

The computer-implemented method may also include further includes monitoring performance of the network after execution of the at least one computer-executable resolution.

The computer-implemented method may also include where identifying the at least one OT device that is vulnerable to the at least one cybersecurity risk includes detecting at least one incident representing attempted unauthorized access to the at least one OT device, anomaly behavior performed associated with the at least one OT device after the at least one OT device gains access to the network, anomaly traffic in inbound and/or outbound access to the network, existence of a connection of at least one untrusted device on the network, an internal threat to the network, or malware present in the network.

The computer-implemented method may also include where determining whether to automatically initiate the at least one computer-executable resolution includes determining that the at least one computer-executable resolution is to be automatically performed, and where the computer-implemented method further includes automatically isolating at least a portion of the network, the portion of the network includes at least the at least one OT device.

The computer-implemented method may also include where determining whether to automatically initiate the at least one computer-executable resolution includes determining that the at least one computer-executable resolution is not to be automatically performed, and where the computer-implemented method further includes automatically causing rendering of an alert to an administrator device associated with the network, where the alert includes at least an indication of the solution implementation report, receiving an action response to the alert, and isolating at least a portion of the network in response to the action response, the portion of the network includes at least the at least one OT device. Other technical features may be readily apparent to one skilled in the art from the following figures, descriptions, and claims.

The computer-implemented method may also include further includes in response to automatically executing the at least one computer-executable resolution, automatically generating an alert that indicates performance of the at least one computer-executable resolution, and transmitting the alert to at least one administrator device.

In accordance with another aspect of the present disclosure, an apparatus for managing initiation of an automated healing process for operational technology devices in a network is provided. One example apparatus includes at least one processor and at least one non-transitory memory having computer-coded instructions stored thereon that, in execution with the at least one processor, causes the processor to perform any one of the example computer-implemented methods described herein. In other embodiments, the example apparatus includes means for performing each step of any one of the example computer-implemented methods described herein.

In accordance with another aspect of the present disclosure, a computer program product for managing initiation of an automated healing process for operational technology devices in a network is provided. One example computer program product includes at least one non-transitory computer-readable storage medium having computer program code stored thereon that, in execution with at least one processor, configures the computer program product for performing any one of the example computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates an example data repository table of data records associated with cybersecurity risks in accordance with at least some example embodiments of the present disclosure.

DETAILED DESCRIPTION

Figure 1:
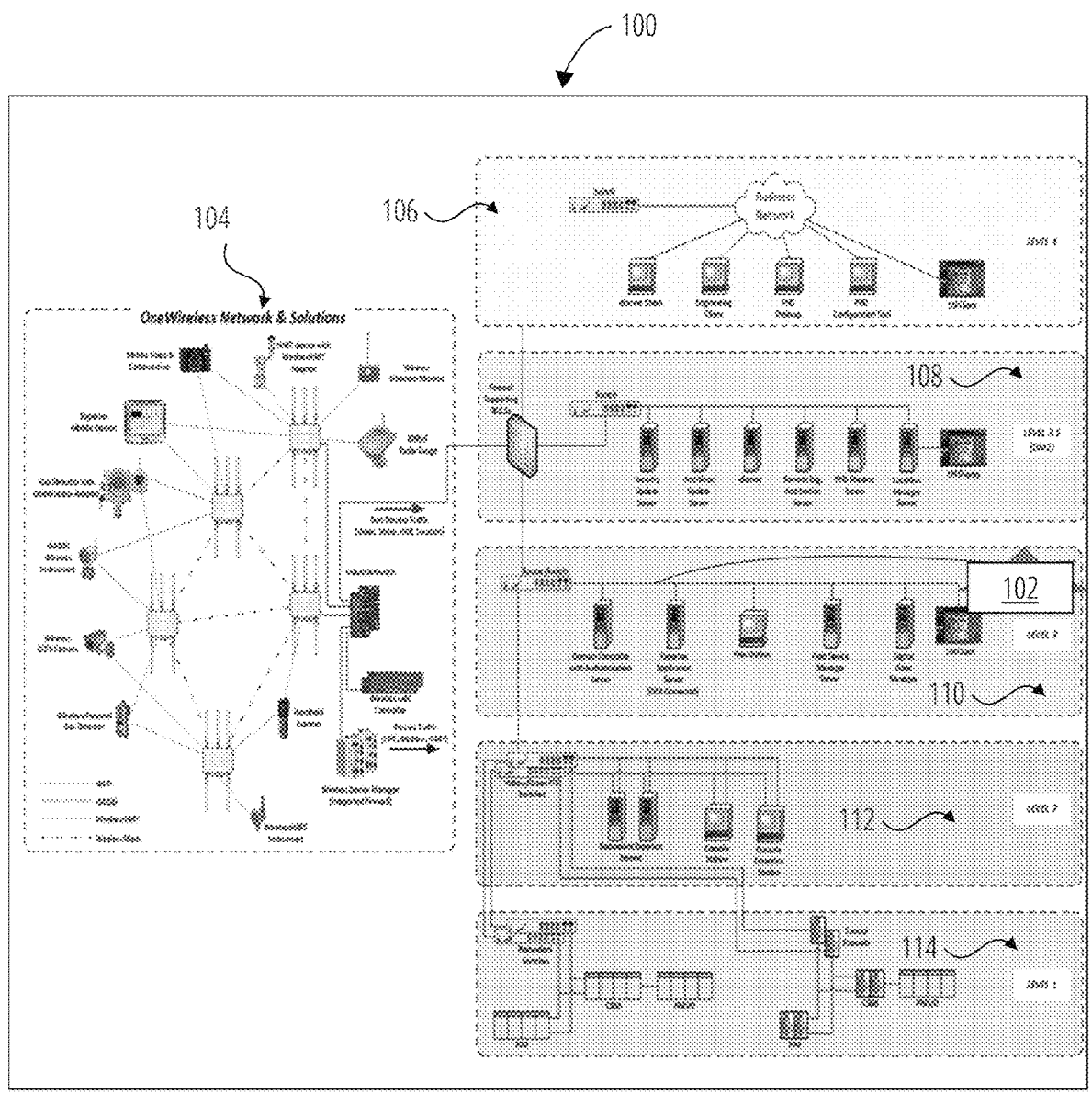
FIG. 1 illustrates a visualization of an example OT/IT network in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Complex industrial and control networks often include a myriad of devices of various types. In many of such contexts, these networks include operational technology devices ("OT devices") that implement or otherwise affect control of at least a portion of an industrial process. Such OT devices may be included with or without additional information technology devices ("IT devices") responsible for collecting, gathering, processing, and/or relaying related data and/or data derived therefrom. The OT devices may form a particular OT network, and may include any number of wired devices connected through wired mechanisms and/or wireless devices that are wirelessly connected to the network. Non-limiting examples of such wired devices include server(s), human-machine interface(s), control station(s), switch(es), router(s), firewall(s), and/or the like, and non-limiting examples of wireless devices include sensor(s), controller(s), field instrument(s), handheld control system(s), mobile phone(s), wireless communication device(s), and/or the like. Such wireless OT devices may include any number and/or types of industrial Internet-of-Things (IIoT) devices that facilitate different functions.

The increasing complexity and dynamic nature of networks having such IIoT and/or generally wireless OT devices relies on efficient, productive, and secure systems that collaborate to ensure industrial processes remain operational and efficient. The collaborative nature of these wireless OT devices is advantageous in that it enables monitoring and control systems that self-organize, are rapidly deployable, highly flexible, and inherently intelligent in their operation. To continue to provide these advantages at scale, such networks often enable addition of more OT devices in the wireless OT network, and require that such added OT devices are communicable with one another and existing devices on the wireless OT network to facilitate a seamless transition of adding a new OT device.

This flexibility in readily enabling addition of new OT devices to the wireless OT network, however, suffers from its own particular technical problems. Each OT device in a network serves as a vulnerability point for prospective cyber-attacks that desire to infiltrate the network, such that the addition of a new wireless OT device provides a new vulnerability point that may be leveraged by malicious actors. As cyber threats continue to increase in prominence within process industries, existing methods for monitoring and mitigating against cyber-attacks to protect critical infrastructure is not sufficient to adequately protect such flexible networks having wireless OT devices. Wired connected devices and IT devices generally may utilize certain existing tools and methodologies to protect against cyberattacks, however the inventors have determined that these methodologies are unlikely to adequately protect OT devices wirelessly connected to a network from such cyberattacks, and thus fails to adequately keep both the individual OT devices and the network as a whole safe from such cyber-attacks.

One such example context is process control OT networks, where man devices are connected through both wireless and wired connections to a network. Such networks often include many wirelessly connected OT devices that are required for efficient and automatic process operations. In a case where any one of the wirelessly connected OT devices becomes compromised, an administrator responsible for maintaining security of the network may not even know. Even if the administrator is informed via a notification in the form of a general security alarm, the steps required for the administrator to identify the device at issue, perform a root cause analysis, determine what action is necessary, and then actually perform the action (if needed) can be significant, such that there may already be impacts from the attack on the operation of the device and/or network. Such a time-consuming task is inefficient, risky to operation of the system, reactionary, and in general not technically sufficient to keep an industrial OT network adequately secure.

Embodiments of the present disclosure provide for improved managing initiation of an automated healing process for operational technology devices in a network. Specifically, some embodiments provide for automatic determination of whether a self-healing action associated with a cybersecurity risk is automatically resolvable through self-healing, or whether manual review of such a resolution is required. Some such embodiments of the present disclosure improve the efficiency of initiating a self-healing process, where possible, while simultaneously maintaining operational robustness of the device(s) and network utilizing manual review of a resolution where it is determined that automatic initiation of the resolution for self-healing is not appropriate. In this regard, embodiments of the present disclosure provide various technical advantages over alternative implementations by facilitating automatic initiation of certain resolutions, and in some embodiments simultaneously enabling a manual and/or more detailed review of resolutions that may affect critical operation of an industrial system, OT device(s), and/or a network. Embodiments provide such advantages for OT devices wirelessly connected to a particular OT and/or IT/OT network, thus providing enhanced cybersecurity protection for such wirelessly connected OT device(s) where conventional cybersecurity protections and methodologies for attempting resolution implementation are insufficient.

Some embodiments detect when there is a new OT device added to or otherwise connected to an OT network. In some such embodiments, data associated with the OT device is collected upon such connection. For example, in some embodiments, a device identity, a device classification, a device type, and/or a connection type (e.g., wired or wireless, or a specific communications protocol) is automatically determined upon connection with the network. In a circumstance where any modification is detected to existing device(s) on the network, then a notification may be generated and transmitted to an administrator device associated with the network for review.

If at least one cybersecurity risk or other problem associated with the OT device is determined, for example based on a classification, device type, or the like determined for the newly added OT device, embodiments may identify at least one computer-executable resolution determined to resolve, protect from, and/or otherwise mitigate a likelihood of the at least one cybersecurity risk or other problem. The cybersecurity risk may not currently be affecting the OT device, and therefore the resolution may represent a proactive action that reduces the likelihood of the cybersecurity risk affecting operation of the OT device and/or other devices on the network with which the OT device is connected. In some embodiments, upon identification of a cybersecurity risk (e.g., currently affecting the OT device and/or network, or representing a possible risk to the OT device and/or network), embodiments may notify an administrator device in parallel with determining whether to automatically initiate a particular resolution, or facilitate a manual review of provided information by an administrator (e.g., a user of an administrator device) for further action based on an action response from the administrator. Some embodiments enable the administrator, via the administrator device for example, to initiate isolation of the OT device or a particular portion of a network in response to the cybersecurity risk to prevent disruption of the operational process performed by the OT devices on the network.

Some embodiments are implemented as a computer-implemented process, apparatus, system, computer program product, and/or the like. Some such embodiments are implemented as via a particular device embodied in hardware, software, firmware, and/or any combination thereof, on an L3 layer of the network, which enables communication and/or identification of message communication(s) of OT devices wired and/or wirelessly connected to the network. In this regard, embodiments of the present disclosure provide for improved cybersecurity protection and managing of automated healing process(es) for both wirelessly connected OT devices as well as wire connected OT devices. The network may have any other number of network layers associated with different devices, types of devices, and/or the like that facilitate different functions associated with operation of the network.

Some embodiments receive data from OT devices on the network, where such OT devices are wirelessly connected or wire connected to the network. In some embodiments, the data embodies or is collected from message communication(s) transmitted over the network. Such data may include details regarding the available devices in the network, including device types, a device model, a device vendor, a device network address, and/or device configuration data. In some embodiments, such data is continuously collected and processed as the network operates.

The data may be collected into one or more data log(s) including some or all of such portions of data. In some embodiments, the data log(s) embody or are standardized via a standardization process into structured log(s) having a particular format that enables normalization of the data in such log(s) for further processing. Additionally or alternatively, in some embodiments, the data log(s) are classified based on one or more data parameter value(s) into different log types that enables comparison and/or monitoring of particular log types in relation to one another.

In some embodiments, the structured log(s) is/are subsequently sent to at least one rules engine for analysis. In some embodiments, the structured log(s) is/are analyzed via at least one rule engine embodying at least one algorithm, machine learning model, and/or the like that identifies anomalies, cybersecurity risk(s), and/or other problem(s) currently or potentially affecting one or more OT device(s) connected to the network. Some embodiments identify such anomalies, cybersecurity risk(s), and/or other problem(s) based at least in part on particular analysis rule function(s), comparison with baseline configuration data, and/or the like. In this regard, such embodiments may identify anomaly traffic, anomaly behavior, other anomalies, problem(s), and/or other indications of cybersecurity risk(s) associated with the OT device or network in whole or in part.

In some embodiments, upon completion of the analysis of the structured log(s), a risk report determined based at least in part on the analysis is generated. The risk report may indicate data associated with detected anomalies, cybersecurity risk(s), problem(s), and/or other incident(s) identified via such analysis. The risk report in some embodiments is transmitted to an administrator device (e.g., a report center) such that an administrator may monitor for any such data indicative of the anomalies, cybersecurity risk(s), problem(s), incident(s), and/or the like.

In a circumstance where embodiments detect any anomalies, cybersecurity risk(s), problem(s), incident(s), and/or the like, embodiments may trigger a notification embodying an alert for further action by an administrator. In some embodiments, the notification is transmitted and/or otherwise rendered to an administrator device. Some such embodiments may include information and/or control(s) that enable the administrator to initiate further action. Additionally or alternatively, some embodiments additionally determine whether to automatically initiate any resolution in parallel with causing rendering of the notification.

Some embodiments determine whether to initiate a self-healing process automatically based on one or more portions of collected and/or derived data. For example, some embodiments identify at least one OT device connected to the network is vulnerable to at least one cybersecurity risk. Such an identification may occur based at least in part on a detected anomaly, problem, incident, and/or the like, or other determination of a cybersecurity risk. The OT device may be wirelessly connected to the network.

Some embodiments identify at least one computer-executable resolution to the at least one cybersecurity risk. In some embodiments, the at least one computer-executable resolution embodies computer program instructions and/or actions that are performable to resolve, mitigate a risk to, and/or otherwise improve protections with respect to the at least one cybersecurity risk. In some embodiments, the at least one computer-executable resolution is identified from a centralized database or solution center based at least in part on data associated with the network, the OT device (e.g., a device type, device model, and/or the like), the cybersecurity risk itself, and/or the like. Non-limiting examples of a computer-executable resolution include a configuration change to the OT device, a configuration change to the network or another device connected to the network, an application patch, a new application to install on the OT device, and/or the like.

Some embodiments execute a simulation based at least in part on the identified at least one computer-executable resolution. For example in some embodiments the simulation tests performance of the network with resolution of the at least one cybersecurity risk utilizing the at least one computer-executable resolution. In some embodiments the simulation is performed in a virtual or non-production environment to avoid impacting the actual operation of the network.

Some embodiments generate a solution implementation report based at least in part on the simulation. The simulation solution implementation report may include data representing metrics or other data resulting from the simulation. In some embodiments, the solution implementation report includes data based at least in part on historical data resulting from implementation of the computer-executable resolution via previous OT device(s), network(s), and/or the like. Such historical data may be limited based on a shared device type, network type, communication connection type, and/or the like. It will be appreciated that the solution implementation report may indicate an impact on any desired metric associated with operation of the OT device, other OT device(s) on the network, and/or the network itself, for example.

Some embodiments determine whether to automatically initiate the at least one computer-executable resolution based at least in part on the solution implementation report. In some embodiments, the solution implementation report indicates whether any critical components, and/or non-critical components, of the network is/are affected by the computer-executable resolution. If any component is affected, in some embodiments the solution implementation report indicates whether such component(s) is/are affected in a critical manner or non-critical manner. Some embodiments initiate computer-executable resolution(s) that are determined to satisfy one or more particular rule(s) of an initiation rule set. For example, some embodiments determine whether to automatically initiate computer-executable resolution(s) based at least in part on whether such computer-executable resolution(s) affect a critical component in any manner or affect a non-critical component in a critical manner, or alternatively whether any of the computer-executable resolution(s) affects a critical component or a non-critical component in a critical manner. In this regard, some embodiments may automatically initiate the computer-executable resolution(s) in a circumstance where none of the rule(s) is violated, and may cause rendering of an alert for review by an administrator to an administrator device if any of the rule(s) is violated (e.g., indicating that automatic implementation of the computer-executable resolution(s) should not occur).

Definitions

"Action response" refers to electronically managed data representing user engagement with a user indicate, where the user engagement corresponds to approval or denial of initiation of a computer-executable resolution.

"Administrator device" refers to any hardware, software, firmware, and/or a combination thereof that is authorized to configure a network and/or one or more device(s) connected to the network.

"Alert" refers to electronically managed data renderable or otherwise presentable via a device that indicates information of at least one computer-executable resolution determined as performable for resolving at least one cybersecurity risk associated with a network.

"Anomaly behavior" refers to electronically managed data indicating detection of one or more value(s) of data parameter(s) falling outside of a normal, expected, or historically-defined range, and/or indicating an unexpected, non-historical, or otherwise impermissible action performed associated with a network.

"Anomaly traffic" refers to electronically managed data indicating detection of one or more message communication(s) having one or more value(s) for data parameter(s) of the message communication(s) that fall outside of a normal, expected, or historically-defined range, and/or otherwise deviate from normal, expected, and/or otherwise historically-defined values.

"Component" refers to any device, machine, system, robot, or hardware, software, firmware, and/or combination thereof, that performs at least a portion of a particular industrial operation, contributes to performance of a particular industrial operation, or otherwise is part of a network facilitating a particular industrial operation. Non-limiting examples of a component include an operational technology device, a backend server, a user-facing terminal, a network switch, a firewall, a personal computer, a user mobile device, and a controller.

"Computer-executable resolution" refers to a process performable by a device embodied by hardware, software, firmware, and/or a combination thereof, that resolves a cybersecurity risk associated with operation of the device or a network with which that device is connected.

"Configuration" refers to one or more data value(s) for one or more data parameter(s) that control operation of a device.

"Critical component" refers to any hardware, software, firmware, and/or any combination thereof, that is indicated as or otherwise marked as performing or otherwise contributing towards performance of an operation of a particular operational system, machine, network, and/or apparatus that satisfies a particular significance threshold.

"Critical manner" refers to an electronically managed data value that represents an impact of a risk to operation of a particular operational system, machine, network, and/or apparatus, that satisfies a particular significance threshold.

"Criticality indication data" refers to electronically managed data that represents a risk of a particular cybersecurity risk or plurality of cybersecurity risks to operation of one or more component(s) of a system, network, machine, and/or apparatus.

"Cybersecurity risk" refers to electronically managed data that represents a determination of a current or potential threat to access, use, and/or monitoring of data for a particular network or one or more component(s). Non-limiting examples of a cybersecurity risk include an out of date security patch determination, an out of date DAT file determination, an active but unused port determination, a default SNMP password determination, a disabled firewall determination, an external storage enabled determination, an anti-virus warning event determination, a downgraded controller application image determination, a controller image mismatch determination, a downgraded controller boot image determination, and a high CPU usage determination.

"Incident" refers to a particular detected event executed via one or more device(s) embodied in hardware, software, firmware, and/or a combination thereof that is detected via data obtained from the one or more device(s) and/or other component(s) of a network.

"Internal threat" refers to a cybersecurity risk that associated with one or more component(s) that is/are connected to, embodied as part of, or otherwise associated with a network that represents a local or internal network, or an internal portion of a network that includes at least a second portion that is exposed to the Internet or another public network.

"Malicious action" refers to a data-driven determination that existence of a particular data value, and/or combination of data value(s), indicates an unauthorized, unintended, and/or detrimental action performed via one or more component(s) associated with a network.

"Message communication" refers to a transmission of data propagated via a network.

"Network" refers to any combination of communicable device(s), each device embodied in hardware, software, firmware, and/or any combination thereof. In some embodiments, a network includes different layers of device(s) that are each configured with different access, permission(s), and/or intended purpose(s) within the network.

"Non-critical component" refers to any hardware, software, firmware, and/or any combination thereof, that is indicated as or otherwise marked as performing and/or otherwise contributing towards performance of an operation of a particular operational system, machine, network, and/or apparatus that does not satisfy a particular significance threshold.

"Non-critical manner" refers to an electronically managed data value that represents an impact of a risk to operation of a particular operational system, machine, network, and/or apparatus, that does not satisfy a particular significance threshold.

"Operational technology device" and "OT device" refer to a particular component configured to monitor and/or control a physical process, machine, infrastructure, and/or other equipment.

"Resolution" refers to improvement of, mitigation of, or elimination of a cybersecurity risk via a computer-executable process.

"Simulation" refers to deployment in a non-production environment of one or more component(s) and/or virtualized version(s) of one or more component(s) associated with a network, where such component(s) in the simulation may be reconfigured and/or otherwise differ from a production environment and from which data and/or metrics may be collected and/or processed. In some contexts, a simulation is comprised entirely of virtualized components with a virtualized topology and/or virtualized configuration(s) that may differ in one or more aspects from an actual topology and/or configuration(s) a corresponding production environment.

"Solution implementation report" refers to electronically managed data indicating particular data-driven metric(s), determination(s), and/or other derivation(s) based at least in part on a simulation.

"Structured log" refers to an arrangement of electronically managed data that represents data associated with configuration and/or operation of one or more component(s). Non-limiting examples of a structured log include a data arrangement representing a current configuration of one or more component(s) at a particular timestamp, an operation performed by one or more component(s), transmission of message communication(s) performed by one or more component(s), application(s) accessed or executed by one or more component(s), and/or another tracked event or data value associated with one or more component(s).

"Unauthorized access" refers to access to data, operation(s), and/or control associated with one or more component(s) of a network that is not permissioned or intended.

"Untrusted device" refers to a device detected as connected to, requesting connected to, or otherwise associated with a network that is not recognized as previously connected and/or permissioned for connection to the network.

"Wirelessly connected" refers to a state of connection of a particular component with a network that enables transmission of one or more message communication(s) via the network utilizing at least one wireless transmission protocol.

Example Systems and Apparatuses of the Disclosure

FIG. 1 illustrates a visualization of an example OT/IT network in accordance with at least some example embodiments of the present disclosure. Specifically, FIG. 1 illustrates an example network 100. In some embodiments, the network 100 includes a plurality of nodes, each facilitating communication to and/or between the various devices connected to the network 100. In this regard, each device connected to the network 100 may be considered a node operating with respect to the network 100.

As illustrated, the network 100 includes a plurality of edge OT nodes 104. In some embodiments, the edge OT nodes 104 includes one or more OT device(s) connected to the network. In some embodiments, the OT device(s) control and/or monitor one or more operation(s) of an industrial system. Additionally or alternatively, in some embodiments, the edge OT node(s) of the edge OT nodes 104 enable interfacing and/or interaction with a monitored and/or controlled environment automatically and/or in response to user input via the device(s) embodying such node(s). For example, in some embodiments, the edge OT nodes 104 includes one or more video and/or collaboration device(s), wireless vibration monitor(s), radar gauge(s), handheld device(s), user device(s), sensor(s), HART device(s), Experion mobile station(s), and/or the like. Additionally or alternatively, in some embodiments, the edge OT nodes 104 includes wireless and/or wired networking solution node(s), for example wireless LAN controller(s), traffic processing device(s), and/or industrial switch(es) that route traffic between particular nodes for transmission and/or further processing. In some embodiments, one or more of the edge OT nodes 104 is wirelessly connected to the network 100, such that message communication(s) transmitted to and/or from a particular node is performed via a wireless communication protocol (e.g., Wi-Fi, Zigbee, Bluetooth, and/or the like). Additionally or alternatively, in some embodiments, the edge OT nodes 104 includes one or more node(s) having a wired connection to the network 100 (e.g., over ethernet, and/or the like). In this regard, the network 100 including at least one wirelessly connected device (e.g., a wirelessly connected OT device) may embody a wireless OT network that facilitates wireless communication(s) with the wirelessly connected device.

The network 100 includes a plurality of nodes arranged in particular layers. In some embodiments, for example, the network 100 is arranged in layers based at least in part on the OSI model of network architecture(s). For example, as illustrated, the network 100 includes a plurality of nodes arranged into particular networking layers, for example L1 nodes 114, L2 nodes 112, L3 nodes 110, L3.5 nodes 108, and L4 nodes 106. In some embodiments, the layers are arranged in a manner that includes particular devices having particular functionality in accordance with the OSI model. For example, in some embodiments, the L1 nodes 114 includes controller(s) and/or physical monitoring devices that perform data collection and/or generation and/or associated switch(es) and/or firewall(s), L2 nodes 112 includes console station(s) and/or redundant server(s) (e.g., Experion servers)

and/or associated switch(es) that perform addressing and/or media access, L3 nodes 110 includes at least one router and/or switch, domain controller with authentication server, application server(s) (e.g., Experion application server(s) and/or the like), field device management server(s), digital video management server(s), client(s), and/or the like that perform logical addressing and pathing of message communication(s) over the network 100, L3.5 nodes 108 that include a primary firewall (e.g., an 802.1x supporting firewall), security management server(s), antivirus management server(s), eServer(s), remote station and engineering server(s), shadow server(s), proxy server(s), and/or the like that embody a DMZ connection with an external and/or public network (e.g., the Internet), and L4 nodes 106 including a switch and business network, engineering client, eServer client, and/or the like that provide access to the functionality and/or data of lower-layer devices from external from a secured portion of the network 100. It will be appreciated that in other embodiments the network layers may be arranged in accordance with other categorizations of functionality.

In some embodiments, the network 100 includes an OT network management system 102 deployed within the network. In some embodiments, the OT network management system 102 includes hardware, software, firmware, and/or any combination thereof, that performs functionality for managing initiation of an automated healing process for operational technology devices in a network as described herein. For example, in some embodiments, the OT network management system 102 includes one or more personal computer(s), application server(s), database server(s), enterprise terminal(s), and/or the like that is specially configured via one or more software application(s) to perform the functionality described herein. In some embodiments, the OT network management system 102 detects and/or otherwise identifies message communication(s) transmitted by and/or between node(s) of the network 100 for processing. Additionally or alternatively, in some embodiments, the OT network management system 102 processes data, for example identified message communication(s), stored data associated with the configuration of the network 100, and/or the like, to detect node(s) that are vulnerable to one or more cybersecurity risk(s), and/or that the network 100 is vulnerable to one or more cybersecurity risk(s). Additionally or alternatively, in some embodiments, the OT network management system 102 identifies at least one resolution for at least one cybersecurity risk, and/or initiates at least one simulation associated with implementation of at least one identified resolution, and/or generation of solution implementation report based at least in part on the at least one simulation. Additionally or alternatively, in some embodiments, the OT network management system 102 processes data to determine whether to automatically initiate at least one resolution to one or more identified cybersecurity risk(s), for example whether to automatically initiate at least one computer-executable resolution, and/or whether to cause rendering of at least one alert for manual review of data associated with an identified cybersecurity risk and/or identified computer-executable resolution.

In some embodiments, the OT network management system 102 is disposed within a particular layer of the network 100. For example, as illustrated, the OT network management system 102 is disposed within the L3 layer of the network 100, as one of the L3 nodes 110. In some embodiments, the OT network management system 102 is disposed in the L3 layer to enable capturing of wireless and wired message communication(s) transmitted via the network 100. In this regard, the OT network management system 102 may enable data-driven determinations associated with wirelessly connected OT devices and/or other node(s) of the network 100 wireless connected for communication via the network 100.

Figure 2:
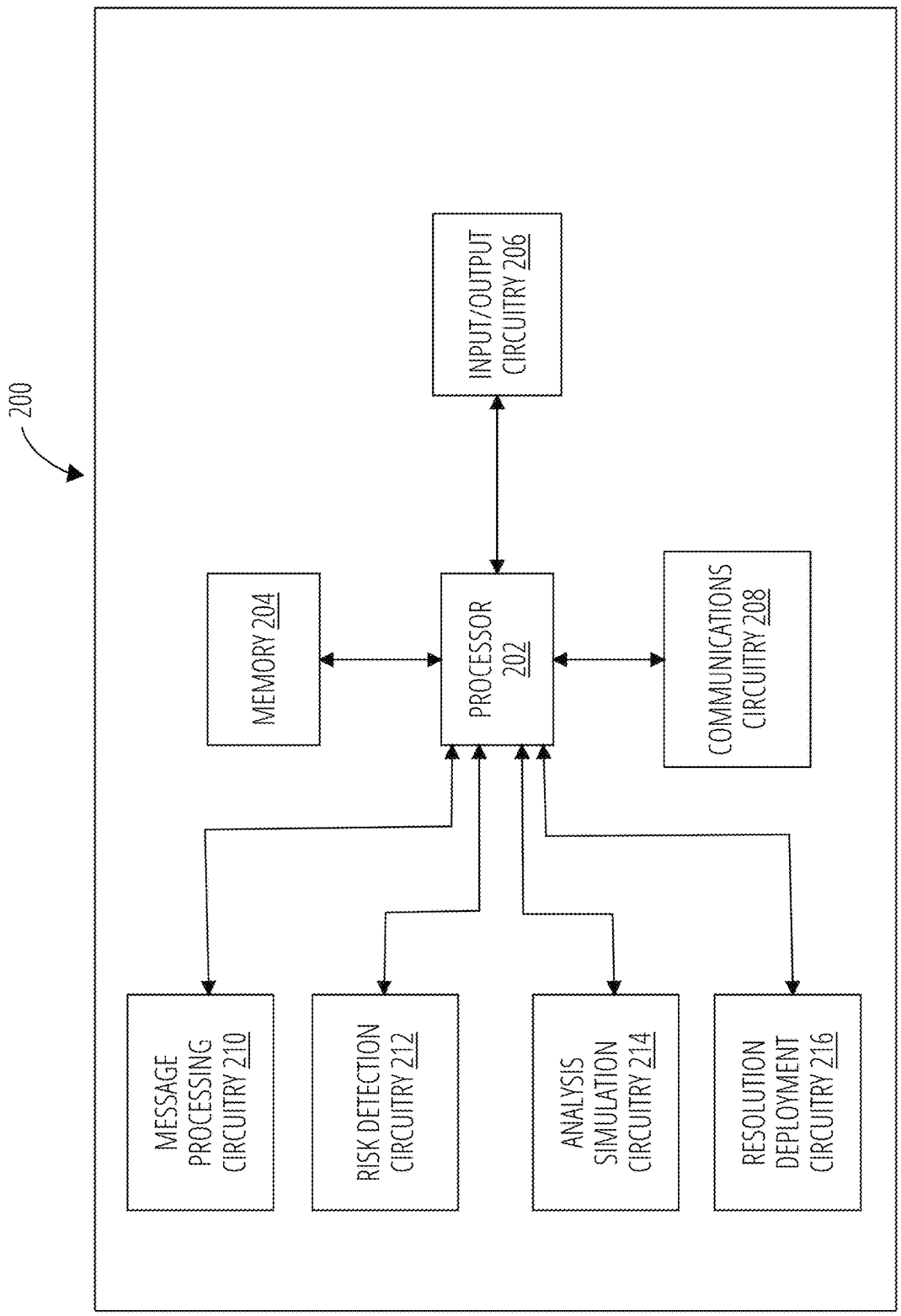
FIG. 2 illustrates a block diagram of an example apparatus that may be specially configured in accordance with at least some example embodiments of the present disclosure.

FIG. 2 illustrates a block diagram of an example apparatus that may be specially configured in accordance with at least some example embodiments of the present disclosure. Specifically, FIG. 2 illustrates an example OT network management apparatus 200 ("apparatus 200") specifically configured in accordance with at least one example embodiment of the present disclosure. In some embodiments, the OT network management system 102, and/or a portion thereof, is embodied by one or more system(s), device(s), and/or the like, such as the apparatus 200 as depicted and described in FIG. 2. The apparatus 200 includes processor 202, memory 204, input/output circuitry 206, communications circuitry 208, message processing circuitry 210, risk detection circuitry 212, analysis simulation circuitry 214, and/or resolution deployment circuitry 216. In some embodiments, the apparatus 200 is configured, using one or more of the sets of circuitry 202, 204, 206, 208, 210, 212, 214, and/or 216, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components of the apparatus 200 are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed. In some embodiments, the processor 202 includes or is embodied by a CPU, microprocessor, and/or the like that executes computer-coded instructions, for example stored via the non-transitory memory 204.

In some example embodiments, the processor 202 is configured to perform various operations associated with managing initiation of an automated healing process for operational technology devices. In this regard, in some embodiments the processor 202 enables automated management of self-healing of cybersecurity risk(s) to a network and/or device(s) wirelessly connected and/or wired connected to a network. In some embodiments, the processor 202 includes hardware, software, firmware, and/or a combination thereof, that detects and/or otherwise identifies message communication(s) transmitted via the network. Additionally or alternatively, in some embodiments, the processor 202 includes hardware, software, firmware, and/or a combination thereof, that generates structured log(s) associated with one or more node(s) on a network, for example the node(s) embodying one or more wired and/or wirelessly connected device(s) on the network. Additionally or alternatively, in some embodiments, the processor 202 includes hardware, software, firmware, and/or a combination thereof, that identifies at least one cybersecurity risk to which one or more device(s), OT device(s), and/or the like, is vulnerable. Additionally or alternatively, in some embodiments, the processor 202 includes hardware, software, firmware, and/or a combination thereof, that identifies at least one computer-executable resolution to the at least one cybersecurity risk. Additionally or alternatively, in some embodiments, the processor 202 includes hardware, software, firmware, and/or a combination thereof, that analyzes and/or models an expected effectiveness of the at least one computer-executable resolution identified corresponding to one or more cybersecurity risk(s). Additionally or alternatively, in some embodiments, the processor 202 includes hardware, software, firmware, and/or a combination thereof, that performs at least one simulation associated with a network. Additionally or alternatively, in some embodiments, the processor 202 includes hardware, software, firmware, and/or a combination thereof, that generates at least one solution implementation report based at least in part on at least one simulation. Additionally or alternatively, in some embodiments, the processor 202 includes hardware, software, firmware, and/or a combination thereof, that determines whether to automatically initiate the at least one computer-executable resolution based at least in part on the solution implementation report, and/or cause rendering of an alert associated with the at least one cybersecurity risk and/or computer-executable resolution for manual review and/or action response inputting via an administrator device.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments, the input/output circuitry 206 includes hardware, software, firmware, and/or a combination thereof, that facilitates simultaneously display of particular data via a plurality of different devices.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch (es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the apparatus 200.

In some embodiments, the apparatus 200 includes message processing circuitry 210. In some embodiments the message processing circuitry 210 includes hardware, software, firmware, and/or the like, that detects a message communication transmitted via a particular network. In some such embodiments, the message processing circuitry 210 detects at least one message communication from a network with which the apparatus 200 is connected, for example as part of an L3 layer of the network. Additionally or alternatively, in some such embodiments, the message processing circuitry 210 detects such message communication(s) from wirelessly connected nodes, for example wirelessly connected OT device(s) on the network. Additionally or alternatively, in some embodiments, the message processing circuitry 210 includes hardware, software, firmware, and/or a combination thereof, that identifies and/or extracts data from at least one detected message communication. Additionally or alternatively, in some embodiments, the message processing circuitry 210 includes hardware, software, firmware, and/or a combination thereof, that generates and/or stores at least one structured log based at least in part on data of at least one message communication detected via the network. In some embodiments, the message processing circuitry 210 includes a separate processor, specially configured field programmable gate array (FPGA), or a specially programmed application specific integrated circuit (ASIC).

In some embodiments, the apparatus 200 includes risk detection circuitry 212. In some embodiments, the risk detection circuitry 212 includes hardware, software, firmware, and/or a combination thereof, that supports detection and/or identification of at least one cybersecurity risk to which at least one node connected to the network, for example an OT device, is vulnerable. Additionally or alternatively, in some embodiments, the risk detection circuitry 212 includes hardware, software, firmware, and/or a combination thereof, that processes structured log(s) and/or other message communication(s) to identify at least one OT device wirelessly connected to a network that is vulnerable to at least one cybersecurity risk. In some embodiments, the risk detection circuitry 212 includes hardware, software, firmware, and/or a combination thereof, that processes structured log(s) and/or message communication(s) to detect a particular incident from the message communication(s). In some embodiments, the risk detection circuitry 212 includes hardware, software, firmware, and/or a combination thereof, that compares data associated with operation of a network with baseline data associated with a baseline operation of the network (e.g., a historical or expected operation of a network or particular configuration(s) of nodes on the network). In some embodiments, the risk detection circuitry 212 includes a separate processor, specially configured field programmable gate array (FPGA), or a specially programmed application specific integrated circuit (ASIC).

In some embodiments, the apparatus 200 includes analysis simulation circuitry 214. In some embodiments, the analysis simulation circuitry 214 includes hardware, software, firmware, and/or a combination thereof, that supports analysis of particular computer-executable resolution(s) corresponding to particular cybersecurity risk(s). Additionally or alternatively, in some embodiments, the analysis simulation circuitry 214 includes hardware, software, firmware, and/or a combination thereof, that identifies at least one computer-executable resolution corresponding to at least one cybersecurity risk, for example where the at least one computer-executable resolution improves or otherwise prevents manifestation of the cybersecurity risk. Additionally or alternatively, in some embodiments, the analysis simulation circuitry 214 includes hardware, software, firmware, and/or a combination thereof, that processes at least one identified computer-executable resolution to determine whether the computer-executable resolution is automatically implementable. In some such embodiments, the analysis simulation circuitry 214 includes hardware, software, firmware, and/or a combination thereof, that generates and/or performs a simulation of implementing at least one identified computer-executable resolution, and/or generates data representing the results of such a simulation. In some such embodiments, the analysis simulation circuitry 214 includes hardware, software, firmware, and/or a combination thereof, that generates a solution implementation report including data representing the results of the simulation (e.g., effects of implementing the computer-executable resolution on the operation of the device or network). In some embodiments, the analysis simulation circuitry 214 includes a separate processor, specially configured field programmable gate array (FPGA), or a specially programmed application specific integrated circuit (ASIC).

In some embodiments, the apparatus 200 includes resolution deployment circuitry 216. In some embodiments, the resolution deployment circuitry 216 includes hardware, software, firmware, and/or a combination thereof, that supports various functionality associated with determining whether to automatically initiate at least one computer-executable resolution. In some such embodiments, the resolution deployment circuitry 216 includes hardware, software, firmware, and/or a combination thereof, that processes a solution implementation report to determine whether to automatically initiate the at least one computer-executable resolution. Additionally or alternatively, in some such embodiments, the resolution deployment circuitry 216 includes hardware, software, firmware, and/or a combination thereof, that determines whether the at least one computer-executable resolution and/or associated cybersecurity risk(s) is/are associated with affecting a critical component in a critical or non-critical manner, and/or affecting a non-critical component in a critical manner, where the determination of whether to automatically initiate the at least one computer-executable resolution is based at least in part on the determination with respect to criticality. Additionally or alternatively, in some such embodiments, the resolution deployment circuitry 216 includes hardware, software, firmware, and/or a combination thereof, that automatically initiates the at least one computer-executable resolution in response to a determination that the at least one computer-executable resolution should be automatically initiated.

Additionally or alternatively, in some such embodiments, the resolution deployment circuitry 216 includes hardware, software, firmware, and/or a combination thereof, that generates and/or causes rendering of an alert to an administrator device in a circumstance in response to a determination that the at least one computer-executable resolution should not be automatically initiated (e.g., to enable manual review by an administrator). Additionally or alternatively, in some such embodiments, the resolution deployment circuitry 216 includes hardware, software, firmware, and/or a combination thereof, that receives an action response in response to the alert provided to an administrator device, and automatically initiates the at least one computer-executable resolution or disregards the at least one computer-executable resolution based at least in part on the action response. Additionally or alternatively, in some such embodiments, the resolution deployment circuitry 216 includes hardware, software, firmware, and/or a combination thereof, that stores to and/or maintains a data repository including performed computer-executable resolution(s), determination(s) associated with the automatic initiation of the at least one computer-executable resolution(s), and/or action response(s) associated with the at least one computer-executable resolution(s). In some embodiments, the resolution deployment circuitry 216 includes a separate processor, specially configured field programmable gate array (FPGA), or a specially programmed application specific integrated circuit (ASIC).

Additionally or alternatively, in some embodiments, two or more of the sets of circuitries 202-216 are combinable. Alternatively or additionally, in some embodiments, one or more of the sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the message processing circuitry 210, the risk detection circuitry 212, the analysis simulation circuitry 214, and/or the resolution deployment circuitry 216, is/are combined with the processor 202, such that the processor 202 performs one or more of the operations described above with respect to each of these sets of circuitry 210-216.

Example Processing Flow of the Disclosure

Figure 3:
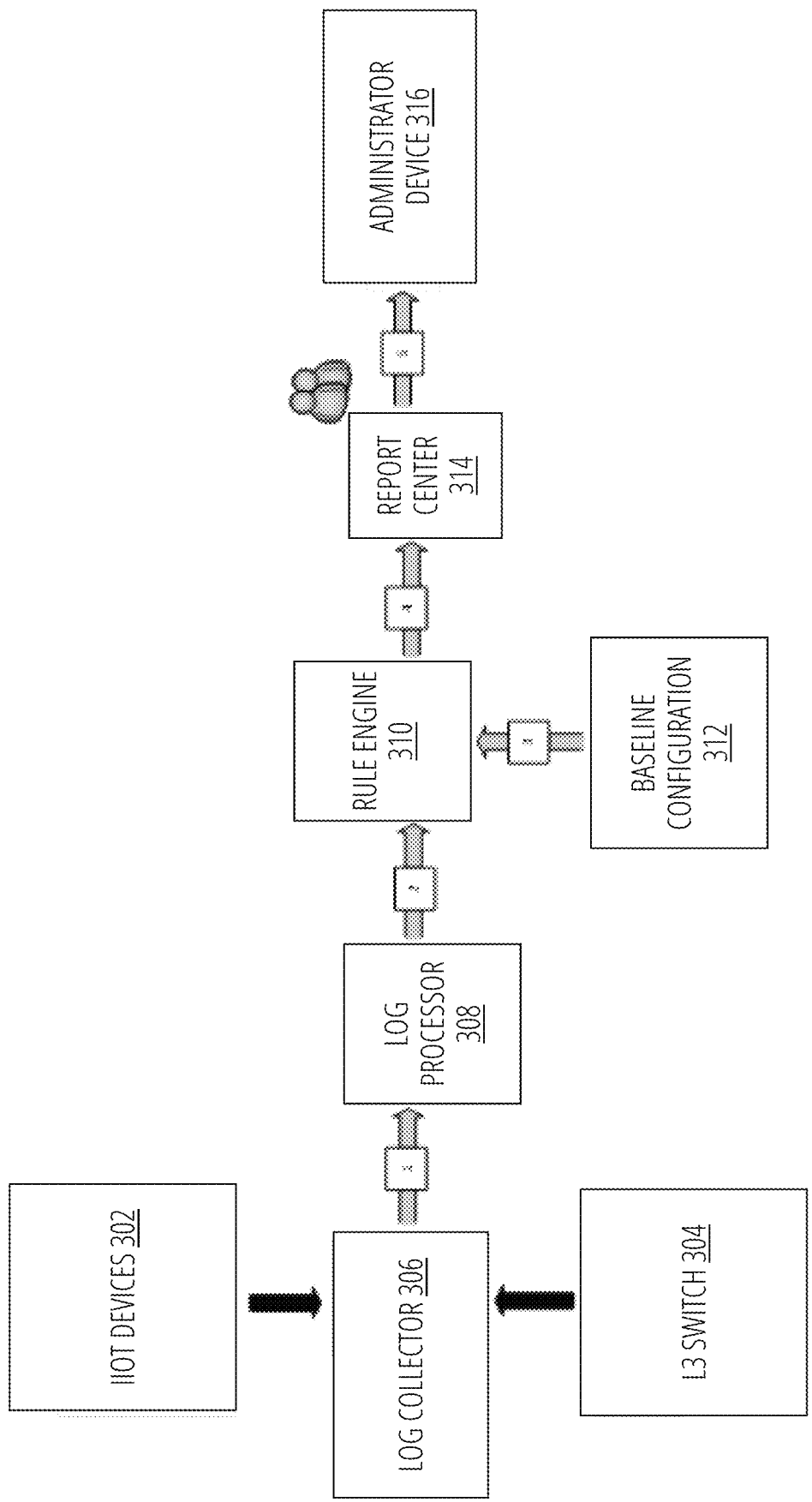
FIG. 3 illustrates an example visualization of operations performed for managing initiation of an automated healing process for operational technology devices in a network in accordance with at least some example embodiments of the present disclosure.

FIG. 3 illustrates an example visualization of operations performed for managing initiation of an automated healing process for operational technology devices in a network in accordance with at least some example embodiments of the present disclosure. In some embodiments, the operations embody a data flow between particular device(s) and/or sub-systems of a device for managing initiation of an automated healing process for operational technology devices in a network. For example, in some embodiments, the data flow occurs between IIOT devices 302, L3 switch 304, and administrator device 316 in communication with apparatus 200 each disposed within a particular network (e.g., a wireless OT network). As illustrated, the log collector 306, log processor 308, rule engine 310, and report center 314 are embodied in whole or in part by sub-systems of the apparatus 200, for example embodied in hardware, software, firmware, and/or any combination thereof.

As illustrated, the IIOT devices 302 and L3 switch 304 interact with the log collector 306. In some embodiments, the IIOT devices 302 includes one or more OT device(s) wirelessly connected to the network. In some embodiments, the log collector 306 generates and/or otherwise extracts data log(s) based at least in part on the operation of the IIOT devices 302 with the network. For example, in some embodiments, the log collector 306 generates and/or otherwise collects data log(s) based at least in part on data associated with the identity and/or configuration(s) IIOT devices 302. Alternatively or additionally, in some embodiments, the IIOT devices 302 generates and/or collects data log(s) based at least in part on message communication(s) transmitted over a particular network, for example where the network includes the L3 switch 304. In some such embodiments, the message communication(s) may be captured and/or processed upon reaching the L3 switch 304, for example to enable capturing of message communication(s) transmitted over wireless means and/or wired means.

In some embodiments, the log collector 306 (e.g., embodied as a subsystem of the 200) provides the generated and/or collected data log(s) to the log processor 308. In some embodiments, the data log(s) are in an unstandardized and/or unnormalized format that makes comparison, processing, and/or storing of the logs impractical or impossible. In some such embodiments, the log processor 308 may normalize the data logs into structured log(s) of a standardized format to enable such comparison, processing, and/or storing of the structured log(s). Additionally or alternatively, in some embodiments, the log processor 308 classifies the type of structured log(s) for comparison and/or monitoring with respect to the network, as described herein.

In some embodiments, the log processor 308 provides the structured log(s) to the rule engine 310 for processing. For example, in some embodiments, the log processor 308 (e.g., embodied by a sub-system of the apparatus 200 in hardware, software, firmware, and/or any combination thereof) processes the structured log(s) to detect particular anomalies, deviations, or other unexpected behaviors, for example that indicate one or more cybersecurity risk(s). In some embodiments, the log processor 308 includes any of a myriad of rule set(s), algorithm(s), machine learning model(s), artificial intelligence model(s), and/or the like that detect vulnerabilities (e.g., indicative of vulnerability to a particular cybersecurity risk, for example) based at least in part on the structured log(s). Additionally or alternatively, in some embodiments, the rule engine 310 processes the structured log(s) based at least in part on comparison with a baseline configuration. For example, in some embodiments, the rule engine 310 compares the structured log(s) with a baseline configuration 312 to determine whether the structured log(s) indicate deviation(s) in configuration(s), anomalies in the data log(s) (e.g., anomaly traffic, anomaly behavior, and/or the like), or any other cybersecurity risk. In some embodiments, the rule engine 310 retrieves baseline configuration data embodying the rule engine 310, and/or retrieves a rule set, model, and/or the like, utilized for processing the structured log(s) from at least one data repository that stores such data. In some embodiments, the rule engine 310 generates a report indicating the results of the processing of the data log(s) by the rule engine 310. For example, in some embodiments, the report indicates results representing detected changes in configuration(s), abnormal functionality, or other incident(s) detected based at least in part on the structured log(s).

In some embodiments, the rule engine 310 transmits the report to the report center 314. In some embodiments, the report center 314 (e.g., embodied by a sub-system of the apparatus 200 in hardware, software, firmware, and/or any combination thereof) stores the report. Additionally or alternatively, in some embodiments, the report center 314 causes generation of at least one alert based at least in part on a detected configuration change, anomaly, or other incident represented in the report. For example, in some embodiments, the report center 314 causes generation of at least one alert at an administrator device 316, such that an administrator associated with the administrator device 316 may view a user interface including or based at least in part on the alert to review the alert and/or initiate a desired resolution. Additionally or alternatively, in some embodiments, the report center 314 initiates or causes initiation of a self-healing process, for example to automatically initiate a computer-executable resolution, in a circumstance where the report satisfies one or more defined criterion/criteria, as described herein.

Figure 4:
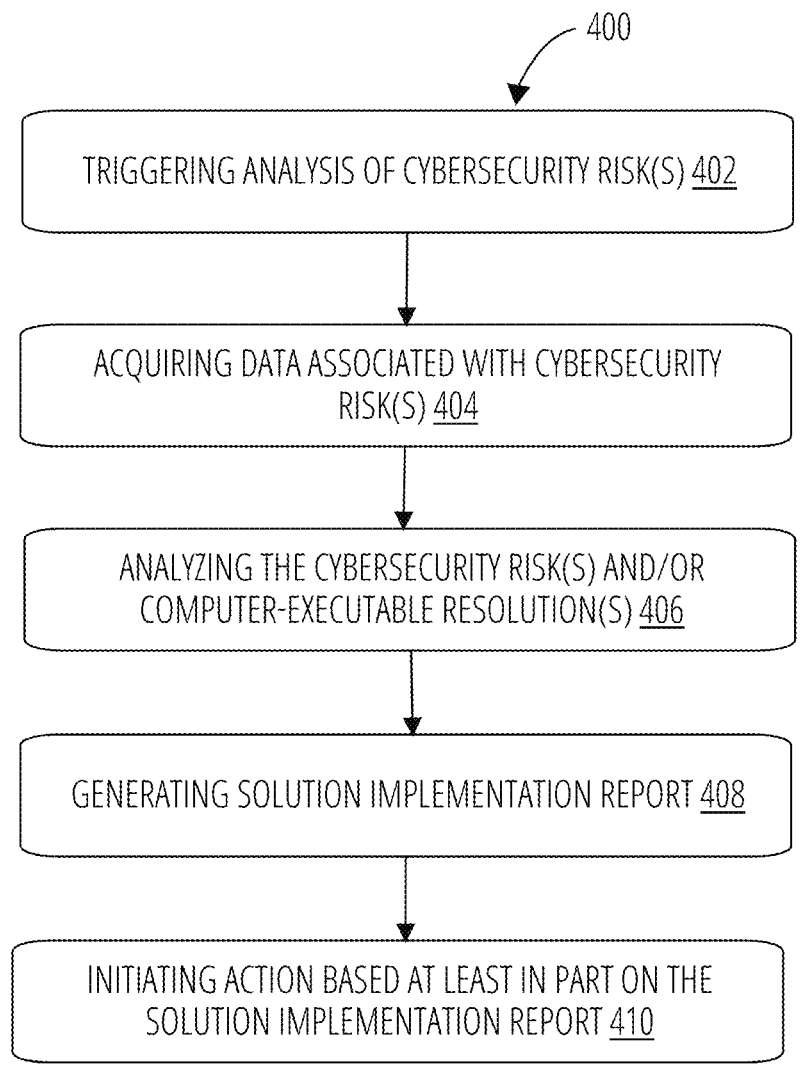
FIG. 4 illustrates a flowchart depicting example operations of a process for managing initiation of an automated healing process for operational technology devices in a network in accordance with at least some example embodiments of the present disclosure.

FIG. 4 illustrates a flowchart depicting example operations of a process for managing initiation of an automated healing process for operational technology devices in a network in accordance with at least some example embodiments of the present disclosure. In some embodiments, the apparatus 200 performs the operations of the process 400 to initiate automated self-healing via one or more automatically initiated computer-executable resolution(s) in one or more defined circumstances.

The apparatus 200 includes means such as message processing circuitry 210, risk detection circuitry 212, analysis simulation circuitry 214, resolution deployment circuitry 216, communications circuitry 208, input/output circuitry 206, and/or processor 202, and/or a combination thereof, for triggering analysis of cybersecurity risk(s) 402. In some embodiments, the apparatus 200 triggers analysis of cybersecurity risk(s) upon detection of one or more data-driven triggering conditions. For example, in some embodiments, the apparatus 200 triggers analysis of the cybersecurity risk(s) with respect to a particular network upon detection of a new node being connected to or otherwise connected to a network. It will be appreciated that in other embodiments, other data-driven triggering condition(s) may be utilized.

The apparatus 200 includes means such as message processing circuitry 210, risk detection circuitry 212, analysis simulation circuitry 214, resolution deployment circuitry 216, communications circuitry 208, input/output circuitry 206, and/or processor 202, and/or a combination thereof, for acquiring data associated with cybersecurity risk(s) 404. In some embodiments, the apparatus 200 identifies identification data associated with at least the newly connected device that triggered analysis (e.g., a new wirelessly connected OT device), and classifies the type of device as well as the mechanism utilized by the device to connect with the network (e.g., whether the device is wirelessly connected or via wired connection). In some embodiments, the detected device embodying a node includes a wirelessly connected OT device communicable with the network, for example that is not previously trusted or that is newly introduced associated with the network. Such collected data may be processed to determine one or more cybersecurity risk(s) associated with the network. In some embodiments the apparatus 200 acquires data log(s) representing such data. In some embodiments, the apparatus 200 retrieves a data set of candidate resolutions, including the at least one computer-executable resolution, from a knowledge base or other repository. In some embodiments, the apparatus 200 queries for or otherwise identifies the resolution(s) based at least in part on the identified cybersecurity risk(s).

The apparatus 200 includes means such as message processing circuitry 210, risk detection circuitry 212, analysis simulation circuitry 214, resolution deployment circuitry 216, communications circuitry 208, input/output circuitry 206, and/or processor 202, and/or a combination thereof, for analyzing the cybersecurity risk(s) and/or computer-executable resolution(s) 406. In some embodiments, the apparatus 200 analyzes the cybersecurity risk(s) and/or computer-executable resolution(s) to determine whether the newly connected OT device (or other device) in any way modifies the existing network configuration and/or topology, or otherwise indicates a particular incident for detection. Additionally or alternatively, in some embodiments, the apparatus 200 analyzes performance effects of cybersecurity risk(s) via simulation, for example to determine the effects of implementing the computer-executable resolution(s) on the operation of the network and/or connected device(s) thereof.

The apparatus 200 includes means such as message processing circuitry 210, risk detection circuitry 212, analysis simulation circuitry 214, resolution deployment circuitry 216, communications circuitry 208, input/output circuitry 206, and/or processor 202, and/or a combination thereof, for generating solution implementation report 408. In some embodiments, the solution implementation results includes data indicating particular identified cybersecurity risk(s), criticality of the cybersecurity risk(s), and/or identified computer-executable resolution(s) associated with such cybersecurity risk(s). Additionally or alternatively, in some embodiments, the solution implementation report includes a determination of whether a computer-executable resolution is automatically initiable, for example based at least in part on the results of the analysis at 406, as described further herein.

The apparatus 200 includes means such as message processing circuitry 210, risk detection circuitry 212, analysis simulation circuitry 214, resolution deployment circuitry 216, communications circuitry 208, input/output circuitry 206, and/or processor 202, and/or a combination thereof, for initiating action based at least in part on the solution implementation report 410. In some embodiments, the action comprises at least causing generation of an alert to an administrator device regarding a cybersecurity risk and/or corresponding identified resolution (e.g., a computer-executable resolution and/or manual resolution). In some embodiments, the alert is generated as an email, alarm, notification, and/or other user interface transmitted to an administrator device for subsequent rendering. In some embodiments, the alert includes data indicating whether there is any change to existing and/or the new device in the network, whether a newly connected device has been previously trusted, and the criticality of the cybersecurity risk (e.g., represented by criticality indication data for example determined based at least in part on the analysis). In some embodiments, the apparatus 200 causes generation and/or transmission of the alert in real-time to promptly make the administrator associated with the administrator device aware of such circumstance(s) and/or determination(s).

Additionally or alternatively, in some embodiments, the action includes automatically initiating one or more computer-executable resolution. In some embodiments, the apparatus 200 automatically initiates a computer-executable resolution in a circumstance where one or more data-driven condition(s) is/are satisfied. For example, in some embodiments, the apparatus 200 determines whether a computer-executable resolution would impact a critical component of an industrial plant associated with the network, or would impact a non-critical component in a critical manner, such that a computer-executable resolution is only automatically initiated in a circumstance where no critical components nor non-critical components in a non-critical manner is/are affected. Alternatively or additionally, in some embodiments, the apparatus 200 automatically initiates computer-executable resolution(s) for critical component(s) and/or components at risk of being affected in a critical manner to proactively reduce the likelihood of a cybersecurity risk manifesting to significantly disrupt such component(s).

Example Data Architectures of the Disclosure

Figure 5:
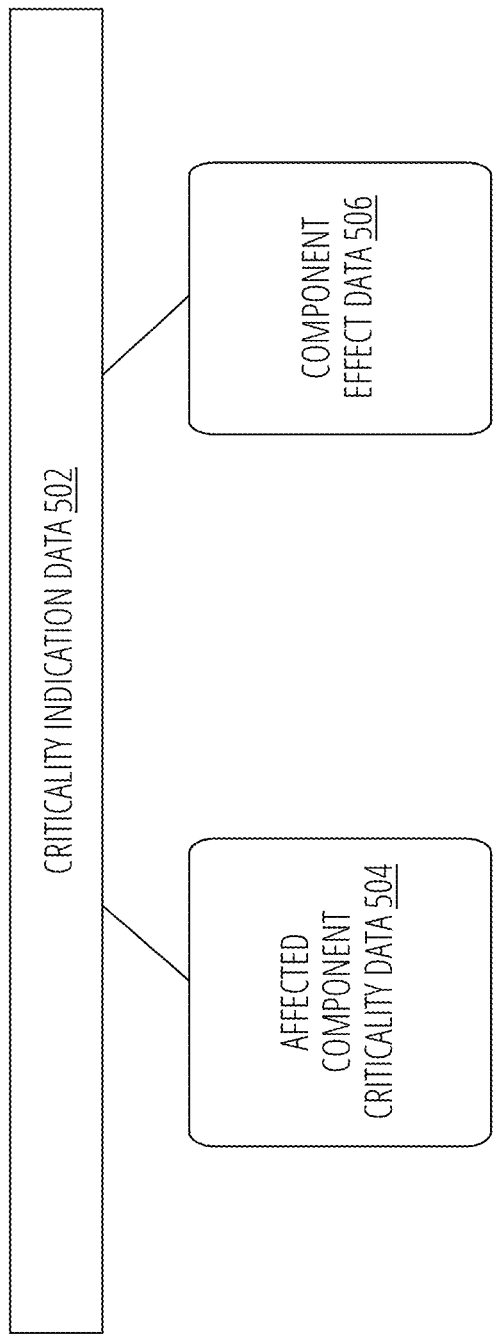
FIG. 5 illustrates an example data architecture of criticality indication data in accordance with at least some example embodiments of the present disclosure.

FIG. 5 illustrates an example data architecture of criticality indication data in accordance with at least some example embodiments of the present disclosure. Specifically, FIG. 5 depicts example criticality indication data 502. In some embodiments, the apparatus 200 generates and/or otherwise identifies criticality indication data associated with a particular cybersecurity risk identified for a particular network and/or industrial system associated therewith. For example, in some embodiments the apparatus 200 determines criticality indication data for each identified cybersecurity risk associated with the network.

As illustrated, the criticality indication data 502 includes affected component criticality data 504. In some embodiments, the affected component criticality data 504 identifies one or more component(s) that are vulnerable and/or otherwise at risk of being affected by a cybersecurity risk associated with the criticality indication data 502. Additionally or alternatively, in some embodiments, the criticality indication data 502 indicates whether a particular affected component is a critical component or a non-critical component. In some embodiments, the apparatus 200 maintains data records indicating whether a particular component is critical.

Additionally or alternatively, in some embodiments, the criticality indication data 502 includes data indicating the criticality of effects of the cybersecurity risk on the network and/or particular component(s). For example, in some embodiments the affected component criticality data 504 indicates whether a particular component vulnerable to a cybersecurity risk is affected in a critical manner or a non-critical manner. In this regard, the affected component criticality data 504 in some such embodiments identifies the affected component criticality data 504 indicates one or more component(s) affected or otherwise vulnerable to at least one cybersecurity risk and the manner in which such component(s) is/are affected. Additionally or alternatively, in some embodiments, the criticality indication data 502 indicates a criticality level from a plurality of candidate criticality levels, for example that indicates the severity of a cybersecurity risk with respect to one or more component(s) and/or the network.

The criticality indication data 502 includes component effect data 506. In some embodiments, the component effect data 506 indicates a potential impact of at least one cybersecurity risk to at least one component associated with the criticality indication data 502. For example, in some embodiments, the component effect data 506 includes a description of a potential impact on the component and/or network in a circumstance where the cybersecurity risk manifests (e.g., via at least one cyber-attack).

Figure 6:
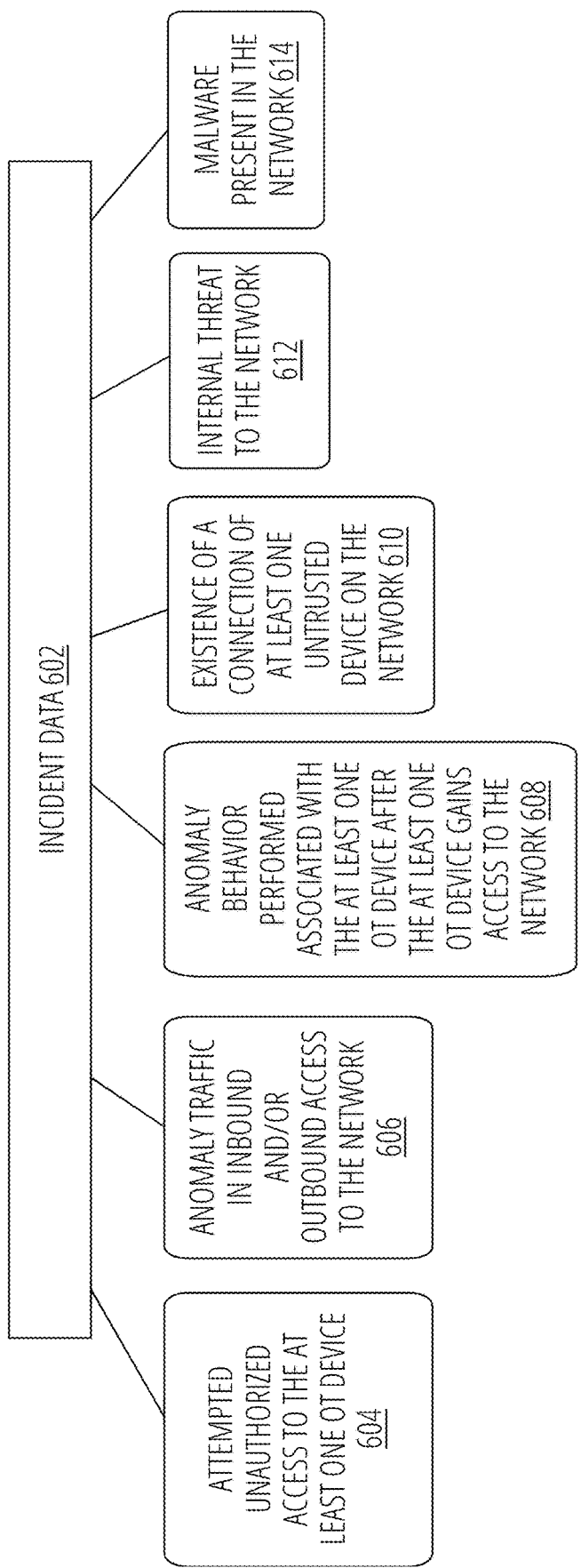
FIG. 6 illustrates an example data architecture of incident data in accordance with at least some example embodiments of the present disclosure.

FIG. 6 illustrates an example data architecture of incident data in accordance with at least some example embodiments of the present disclosure. Specifically, FIG. 6 depicts an example incident data 602 representing a particular incident associated with operation of a component and/or network.

For example, in some embodiments, the apparatus 200 detects the incident data 602 from message communication(s) transmitted over the network, for example by one or more OT device(s) or other device(s) connected to the network. In some embodiments, the apparatus 200 processes message communication(s) and/or data associated therewith utilizing one or more rule engine(s) to generate incident data 602 representing a particular detected incident. In some embodiments, the rule engine(s) detects such incident(s) based at least in part on satisfaction of certain data rule(s), deviation from historical or baseline data value(s), and/or the like. In some embodiments, the incident data 602 includes or embodies a particular data value representing a particular detected incident from a plurality of candidate incidents, for example any of the incidents represented with respect to elements 604-614.

Incident 604 represents detection of an attempted unauthorized access to the at least one OT device. For example, in some embodiments, the apparatus 200 detects the attempted unauthorized access to the at least one OT device in a circumstance where a message communication transmitted via a network includes invalid authentication credentials and/or credentials not permissioned for access to a requested device and/or functionality provided via the network.

Incident 606 represents detection of anomaly traffic in inbound and/or outbound access to the network. For example, in some embodiments, the apparatus 200 detects the anomaly traffic in inbound and/or outbound access to the network where at least one message communication transmitted via the network differs from historical and/or baseline traffic associated with the network. In some embodiments, the apparatus 200 tracks and/or stores metric data representing amount(s), type(s), and/or other parameter(s) associated with message communication(s) transmitted via the network during when in a historical or baseline communication. Additionally or alternatively, in some embodiments, the apparatus 200 compares the metric data for ongoing operation of the network with such historically stored and/or retrieved metric data to detect the anomaly traffic. It will be appreciated that data associated with particular message communication(s) embodying network traffic may be classified and/or grouped as incoming traffic, outgoing traffic, or both.

Incident 608 represents detection of anomaly behavior performed associated with the at least one OT device after the at least one OT device gains access to the network. In some embodiments, for example, the apparatus 200 detects anomaly behavior based at least in part on a deviation with actual behavior performed, or attempted, via the at least one OT device, from expected behavior(s) based at least in part on a determined reason, or authorization(s), provided to the OT device to connect to the network. Additionally or alternatively, in some embodiments, the apparatus 200 detects the anomaly behavior based at least in part in deviation of operation of the at least one OT device with other device(s) connected to the network.

Incident 610 represents existence of a connection of at least one untrusted device on the network. For example, in some embodiments, the apparatus 200 detects existence of a connection of at least one untrusted device by monitoring message communication(s) transmitted over the network. In a circumstance where the apparatus 200 detects a message communication by a particular device over the network, and determines that the particular device is unauthorized, blacklisted, not on a whitelist, or otherwise indicated as untrusted.

Incident 612 represents detection of an internal threat to the network. In some embodiments, the apparatus 200 processes at least one message communication associated with a node connected to the network to determine that at least a portion of the message communication indicates an internal threat. In some embodiments, the apparatus 200 identifies and/or detects configuration data associated with a node to determine that the node is associated with an internal threat.

Incident 614 represents detection of malware present in the network. In some embodiments, the apparatus 200 identifies and/or processes configuration data associated with one or more node(s) of the network to identify malware present in the network. Additionally or alternatively, in some embodiments, the apparatus 200 performs one or more scan(s) of device(s) embodying node(s) on the network to detect malware present on one or more node(s) of the network.

In some embodiments, the apparatus 200 identifies a cybersecurity risk based at least in part on an identified incident represented by generated incident data, for example incident data 602. In this regard, in some embodiments as described herein, the apparatus 200 detect one or more OT device(s), and/or other node(s) of a network, is/are vulnerable to at least one cybersecurity risk based at least in part on at least one detected incident.

FIG. 7 illustrates an example data repository table of data records associated with cybersecurity risks in accordance with at least some example embodiments of the present disclosure. Specifically, FIG. 7 depicts an example table 700. In some embodiments, the table 700 includes data records generated and/or stored in response to detected cybersecurity risks. For example, in some embodiments, the apparatus 200 generates a data record in a circumstance where the apparatus 200 determines that at least one device connected to a network is vulnerable to at least one cybersecurity risk (e.g., an OT device connected to the network). As illustrated, the table 700 includes example data records 702-708.

As illustrated, each data record in the table 700 includes a plurality of data values for various data parameters, each data parameter corresponding to a particular column of the table 700. As illustrated, for example, the table 700 includes a column associated with a record identifier, a column associated with a description of a cybersecurity risk (e.g., a "vulnerability"), criticality indication data indicating a severity of the cybersecurity risk, a column associated with description data of possible cause(s) of the cybersecurity risk, a column associated with potential impact data indicating the impact of a cybersecurity risk on an OT device or network generally, a column associated with a resolution for use in resolving the cybersecurity risk, and a column associated with automatic initiation indication data that indicates whether a resolution is executable automatically or requires generation of an alert and a corresponding action response for initiation. In some embodiments, the apparatus 200 generates the automatic initiation indication data based at least in part on criticality indication data associated with the cybersecurity risk, a type of the cybersecurity risk, and/or another data-driven determination, and/or the like. In some embodiments, one or more of the data values for the columns of the table 700 is/are generated in response to user input, for example the description data as inputted by one or more administrator(s), subject matter expert(s), and/or the like.

In some embodiments, the data from the table 700 is retrieved for processing and/or display. In some embodiments, at least a portion of the data record(s) of the table 700 is renderable to an administrator device. For example, in some embodiments, the apparatus 200 causes rendering of a user interface including data from the data records indicated associated with automatic initiation indication data having a value indicating manual review is required.

Example Processes of the Disclosure

Having described example systems and apparatuses, related data flows, and user interfaces in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 8:
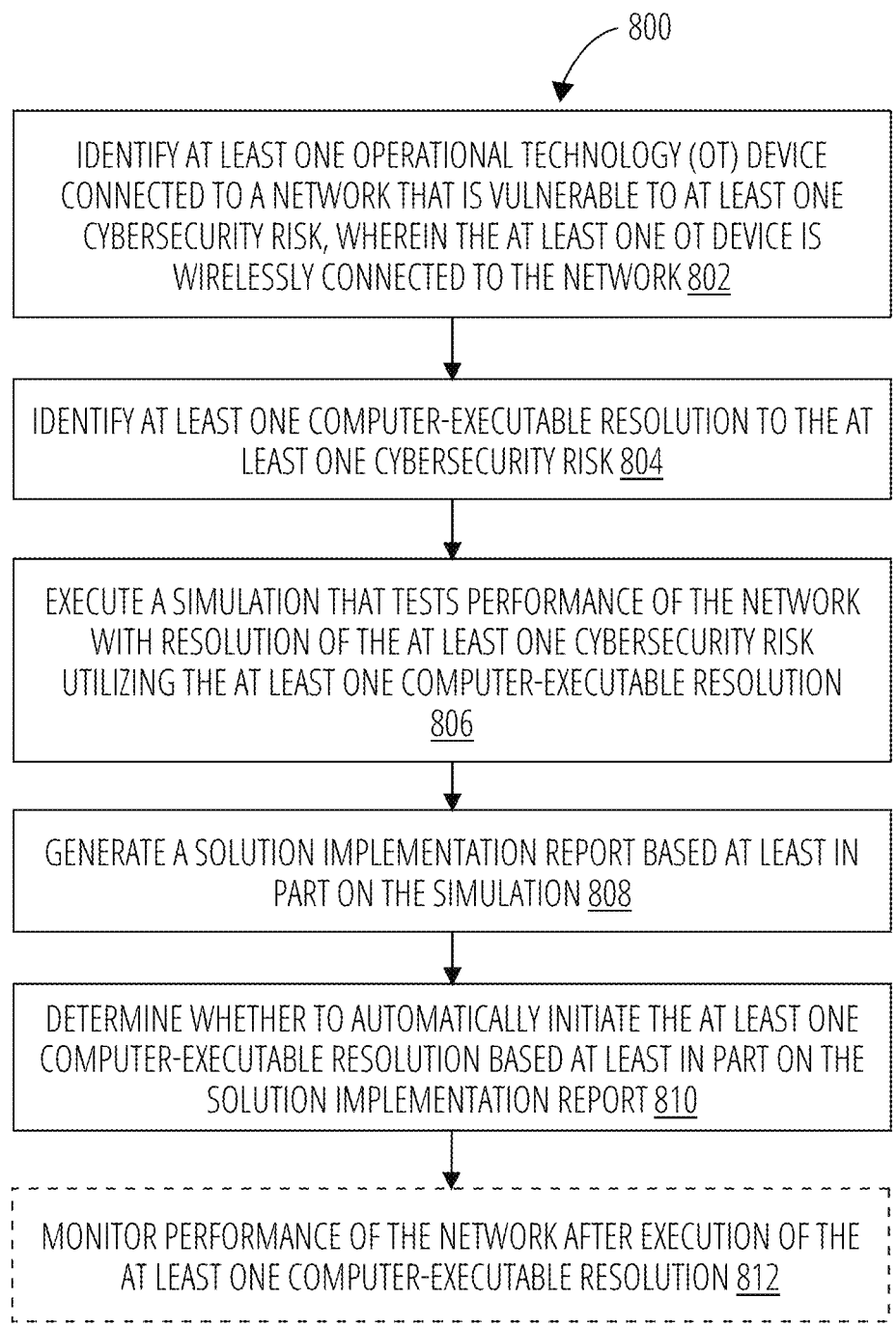
FIG. 8 illustrates a process 800 for managing initiation of an automated healing process for operational technology devices in a network in accordance with one embodiment.

FIG. 8 illustrates a process 800 for managing initiation of an automated healing process for operational technology devices in a network in accordance with one embodiment. The process 800 embodies an example computer-implemented method. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like. For purposes of simplifying the description, the process 800 is described as performed by and from the perspective of the apparatus 200.

The process 800 begins at operation 802. According to some examples, the method includes identifying at least one OT device connected to a network that is vulnerable to at least one cybersecurity risk at operation 802. In some embodiments, the at least one OT device is wirelessly connected to the network. The OT device in some embodiments includes any wireless device embodied in hardware, software, firmware, and/or any combination thereof, that implements or otherwise affects control of at least one operation performed by at least one component of an industrial control system. In some embodiments, the OT device is determined based at least in part on a device type, IP address, or other identifier determined from data of at least one message communication.

In some embodiments, the OT device is identified upon connection to the network. Alternatively or additionally in some embodiments the OT device is identified upon transmission of at least one message communication via the network. Alternatively or additionally, in some embodiments, data associated with the identified OT device may be processed immediately upon identification of the OT device on the network. In some other embodiments, the data associated with the OT device may be processed at one or more other points in time, for example at a particular timestamp interval, upon detecting of a particular data-driven trigger, and/or the like.

In some embodiments, the apparatus 200 identifies an OT device is vulnerable to at least one cybersecurity risk via configuration data, at least one log, and/or other data identified associated with the OT device. In some embodiments, the apparatus 200 identifies, detects, and/or otherwise collects such data from message communication(s) transmitted over the network. Additionally or alternatively, in some embodiments, the apparatus 200 identifies the data indicating a change to the network, and/or operation of any device on the network, resulting from the connection of the OT device. In some embodiments, the apparatus 200 determines whether a particular identified OT device is vulnerable to at least one cybersecurity risk based at least in part on comparison between collected and/or derived data with retrieved and/or stored baseline data. For example, in some embodiments, the apparatus 200 compares the identified configuration change data and/or the like with a baseline configuration, compares identified data associated with the OT device with stored and/or retrieved up-to-date configuration data corresponding to the OT device, and/or performs one or more other comparisons to determine that the OT device is vulnerable to at least one cybersecurity risk based at least in part on the results of the comparison.

According to some examples, the method includes identifying at least one computer-executable resolution to the at least one cybersecurity risk at operation 804. In some embodiments, the apparatus 200 accesses a stored repository of data records that each link at least one cybersecurity risk with at least one corresponding computer-executable resolution. In some embodiments, the apparatus 200 maintains the repository. In some embodiments, the apparatus 200 accesses an external and/or third-party repository. Alternatively or additionally still, in some embodiments, the apparatus 200 receives the computer-executable resolution based at least in part on user input from an administrator, for example where an administrator accesses an administrator device to select a computer-executable resolution from a list of candidate computer-executable resolutions.

According to some examples, the method includes executing a simulation that tests performance of the network with resolution of the at least one cybersecurity risk utilizing the at least one computer-executable resolution at operation 806. For example, the simulation may embody data determined as resulting from updating the OT device and/or network via at least the computer-executable resolution. In some embodiments, the apparatus 200 in some embodiments maintains a simulation in a virtual environment. Alternatively or additionally, in some embodiments, the apparatus 200 retrieves data resulting from previously-executed simulation(s) that represented performance of the same and/or similar computer-executable resolution.

According to some examples, the method includes generating a solution implementation report based at least in part on the simulation at operation 808. In some embodiments, the solution implementation report includes data resulting from the simulation. For example, the solution implementation report may indicate whether anomalous activity associated with an OT device and/or network associated therewith is altered based at least in part on execution of at least one computer-executable resolution. Additionally or alternatively, in some embodiments, the solution implementation report includes log and/or other activity data associated with the OT device and/or operation of the network resulting from the simulation. In this regard, the apparatus 200 generates a solution implementation report indicating whether the at least one computer-executable resolution improved and/or resolved one or more identified cybersecurity risk(s). Additionally or alternatively, in some embodiments, the solution implementation report indicates the effect(s) of one or more computer-executable resolution(s) on performance and/or operation of the network and/or one or more component(s) controlled at least in part by the at least one OT device and/or network.

According to some examples, the method includes determining whether to automatically initiate the at least one computer-executable resolution based at least in part on the solution implementation report at operation 810. In some embodiments, the apparatus 200 performs a determination of whether the solution implementation report indicates that the at least one computer-executable resolution affects at least one component associated with the OT device(s) in a critical manner. Additionally or alternatively, in some embodiments, the apparatus 200 performs a determination of whether the solution implementation report indicates that the at least one computer-executable resolution affects at least one critical component. Additionally or alternatively still, in some embodiments, the apparatus 200 performs such a determination based at least in part on whether the simulation indicated improvement(s) to operation of the OT device, network, and/or the like.

According to some examples, the method includes monitoring performance of the network after execution of the at least one computer-executable resolution at optional operation 812. In some embodiments, the apparatus 200 monitors particular metric(s), log(s), and/or the like associated with the network and/or at least one OT device. In some embodiments, the apparatus 200 stores and/or otherwise tracks data representing the performance of the network. Additionally or alternatively, in some embodiments, the apparatus 200 monitors performance of the network after execution of the at least one computer-executable resolution to detect subsequent cybersecurity risk(s) during operation of the network.

Figure 9:
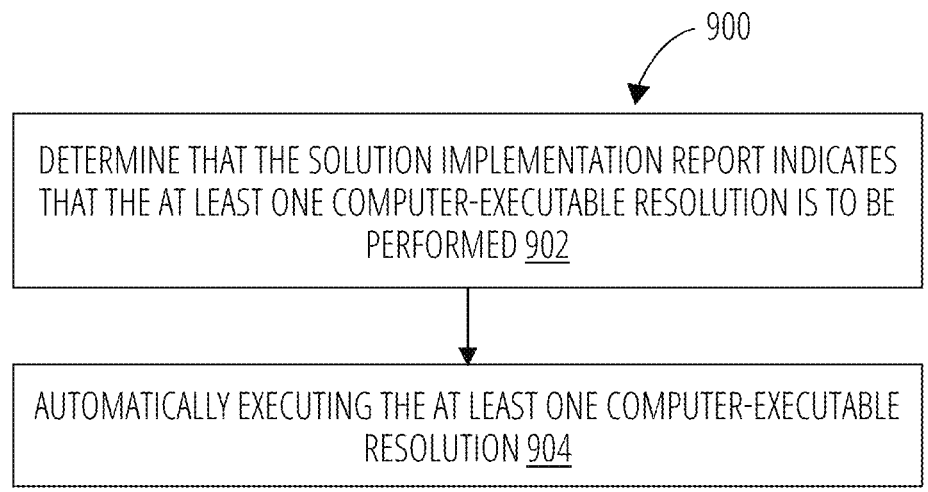
FIG. 9 illustrates a process 900 embodying a sub-process for managing initiation of an automated healing process for operational technology devices in a network in accordance with one embodiment.

FIG. 9 illustrates a process 900 embodying a sub-process for managing initiation of an automated healing process for operational technology devices in a network in accordance with one embodiment. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication separate component(s) of an industrial plant or system, device(s) connected to a network, and/or the like. For purposes of simplifying the description, the process 800 is described as performed by and from the perspective of the apparatus 200.

The process 900 begins at operation 902. In some embodiments, the process 900 begins after one or more operations depicted and/or described with respect to any of the other processes described herein. For example, in some embodiments as depicted, the process 900 begins after execution of operation 808. In this regard, some or all of the process 900 may replace or supplement one or more blocks depicted and/or described with respect to any of the other processes described herein. For example, in some embodiments as depicted, the process 900 supplants, supplements, and/or otherwise replaces an operation of the process 800, such as operation 810. Additionally or alternatively, as depicted, upon completion of the process 900, flow may return to one or more operations of another process. For example, as depicted, flow may return optional operation 812 as depicted and described.

According to some examples, the method includes determining that the solution implementation report indicates that the at least one computer-executable resolution is to be performed at operation 902. In some embodiments, the apparatus 200 determines that the solution implementation report indicates that the at least one computer-executable resolution is to be performed based at least in part on satisfaction of one or more data-driven condition(s). For example, in some embodiments, the apparatus 200 determines that the solution implementation report indicates the computer-executable resolution is associated with a critical component, or a non-critical component affected in a critical manner by a cybersecurity risk. It will be appreciated that any desired data-driven determination may be utilized to determine when to automatically initiate a computer-executable resolution.

According to some examples, the method includes automatically executing the at least one computer-executable resolution at operation 904. In some embodiments, the apparatus 200 initiates the computer-executable resolution on the OT device or another device connected to the network. In some embodiments, the apparatus 200 transmits computer-executable instructions over the network to cause a particular device to execute the computer-executable resolution. For example, the apparatus 200 in some embodiments transmits data embodying an application patch, configuration change value, and/or the like, that is executed by the OT device or an associated device on the network to resolve (e.g., eliminate risk of or improve) the cybersecurity risk.

Figure 10:
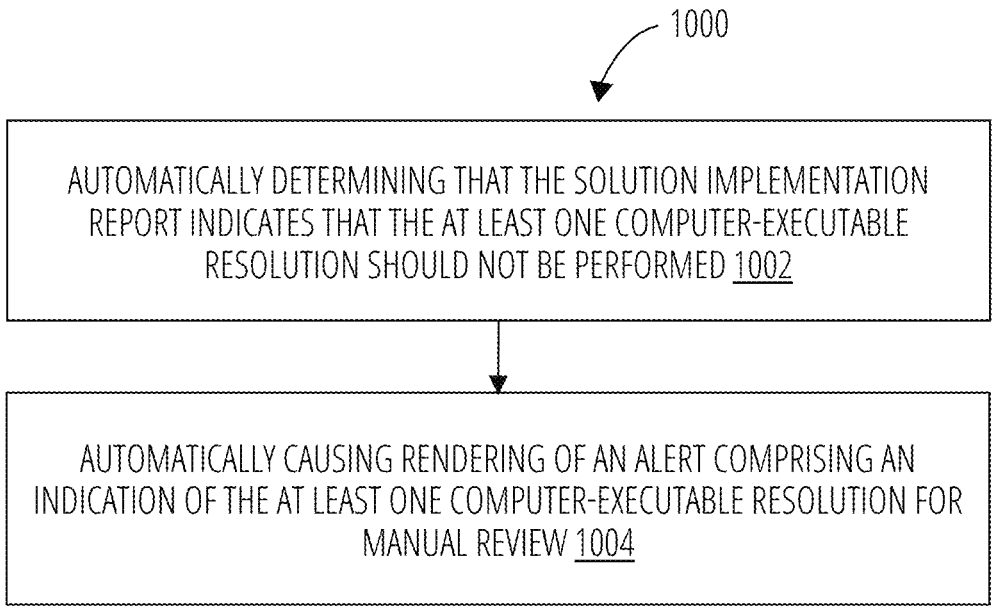
FIG. 10 illustrates a process 1000 embodying a sub-process for managing initiation of an automated healing process for operational technology devices in a network in accordance with one embodiment.

FIG. 10 illustrates a process 1000 embodying a sub-process for managing initiation of an automated healing process for operational technology devices in a network in accordance with one embodiment. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication separate component(s) of an industrial plant or system, device(s) connected to a network, and/or the like. For purposes of simplifying the description, the process 1000 is described as performed by and from the perspective of the apparatus 200.

The process 1000 begins at operation 1002. In some embodiments, the process 1000 begins after one or more operations depicted and/or described with respect to any of the other processes described herein. For example, in some embodiments as depicted, the process 1000 begins after execution of operation 808. In this regard, some or all of the process 1000 may replace or supplement one or more blocks depicted and/or described with respect to any of the other processes described herein. For example, in some embodiments as depicted, the process 1000 supplants, supplements, and/or otherwise replaces an operation of the process 800, such as operation 810. Additionally or alternatively, as depicted, upon completion of the process 1000, flow may return to one or more operations of another process. For example, as depicted, flow may return optional operation 812 as depicted and described.

According to some examples, the method includes automatically determining that the solution implementation report indicates that the at least one computer-executable resolution should not be performed at operation 1002. In some embodiments, the apparatus 200 processes criticality indication data that indicates a manner in which a particular cybersecurity risk affects a particular component. For example, in some embodiments, the solution implementation report indicates whether one or more cybersecurity risk(s) affects, in a critical manner or a non-critical manner, at least one critical component of a network and/or an associated industrial system (e.g., where OT device(s) of the network control one or more operation(s) of the industrial system). Additionally or alternatively, in some embodiments, the solution implementation report indicates whether one or more cybersecurity risk(s) affects, in a critical manner or a non-critical manner, at least one non-critical component of the network and/or an associated industrial system. In some embodiments, the apparatus 200 determines, based at least in part on the solution implementation report, whether the computer-executable resolution(s) resolve at least one cybersecurity risk that affects a critical component in a critical manner or a non-critical component in a critical manner. Affecting such at least one component in a critical manner may indicate that the manifestation of the cybersecurity risk would sufficiently negatively impact operation of the network and/or an associated industrial system. Additionally or alternatively, in some embodiments, a critical component may be determined or otherwise indicated as particularly important for performance of the network or an associated industrial plant, for example such that impacting the critical component in any manner, or otherwise non-critical manner, risks negatively impacting the operation of the entirety of the network and/or associated industrial plant more than a desired threshold.

According to some examples, the method includes automatically causing rendering of an alert comprising an indication of the at least one computer-executable resolution for manual review at operation 1004. In some embodiments, the apparatus 200 generates an alert for transmission to at least one administrator device. The alert in some such embodiments includes text describing the computer-executable resolution. Additionally or alternatively, in some embodiments the alert includes data associated with the corresponding OT device, a description of the cybersecurity risk, criticality indication data associated with the cybersecurity risk (e.g., indicating whether the cybersecurity risk affects a critical component, affects a component in a critical manner, affects a non-critical component in a critical manner, and/or the like). In some embodiments, the apparatus 200 transmits data embodying or otherwise including the alert to the administrator device. In some embodiments, the alert is rendered via the administrator device as a push notification, a user interface to a user-facing application executed on the administrator device, an electronic communication facilitated via a particular messaging application (e.g., an email, text message, instant message, and/or the like). In some embodiments, a user of the administrator device (e.g., an administrator) may view, analyze, and/or otherwise interact with the alert, for example to analyze and/or understand aspect(s) of the cybersecurity risk(s) and/or the like. Additionally or alternatively, in some embodiments, the administrator device may transmit an authorization and/or rejection of the computer-executable resolution, for example in response to user interaction with the alert, to the apparatus 200. In some embodiments, the apparatus 200 automatically initiates the computer-executable resolution in a circumstance where an authorization is received from the administrator device. Additionally or alternatively, in some embodiments, the apparatus 200 stores data representing the action response associated with the alert as received from the administrator device, for example representing the authorization and/or rejection.

Figure 11:
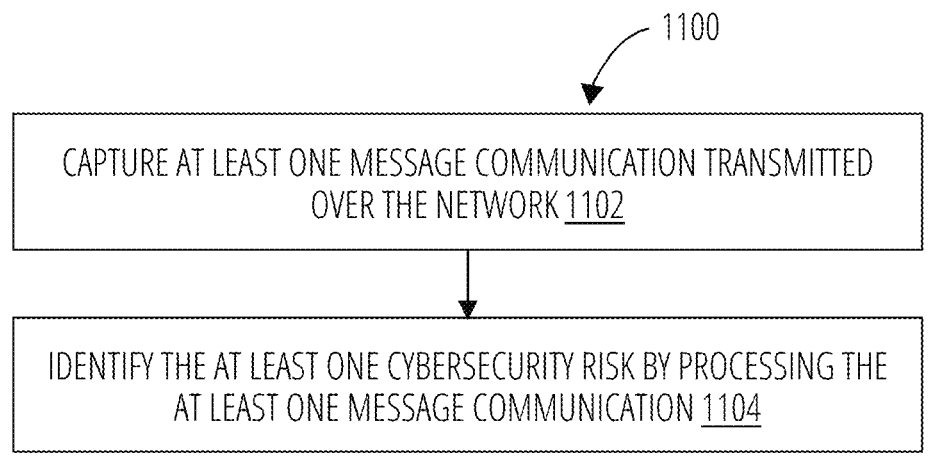
FIG. 11 illustrates a process 1100 embodying a sub-process for managing initiation of an automated healing process for operational technology devices in a network in accordance with one embodiment.

FIG. 11 illustrates a process 1100 embodying a sub-process for managing initiation of an automated healing process for operational technology devices in a network in accordance with one embodiment. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication separate component(s) of an industrial plant or system, device(s) connected to a network, and/or the like. For purposes of simplifying the description, the process 1100 is described as performed by and from the perspective of the apparatus 200.

The process 1100 begins at operation 1102. In some embodiments, the process 1100 begins after one or more operations depicted and/or described with respect to any of the other processes described herein. For example, in some embodiments as depicted, the process 1100 begins before and/or at execution of operation 802. In this regard, some or all of the process 1100 may replace or supplement one or more blocks depicted and/or described with respect to any of the other processes described herein. For example, in some embodiments as depicted, the process 1100 supplants, supplements, and/or otherwise replaces an operation of the process 800, such as operation 802. Additionally or alternatively, as depicted, upon completion of the process 1100, flow may return to one or more operations of another process. For example, as depicted, flow may return operation 804 as depicted and described.

According to some examples, the method includes capturing at least one message communication transmitted over the network at operation 1102. In some embodiments, the apparatus 200 collects message communication(s), and/or data associated therewith, as such message communication(s) are transmitted via the network, for example to another device of the network or an external device through an external network (e.g., the Internet). The apparatus 200 in some embodiments promiscuously listens to each message communication regardless of intended target of the message communication. In some embodiments, the apparatus 200 is disposed within a third layer of the network (e.g., an L3 layer of a network) to enable capturing of wired and/or wireless transmission(s) embodying message communication(s) across the network.

According to some examples, the method includes identifying the at least one cybersecurity risk by processing the at least one message communication at operation 1104. In some embodiments, the apparatus 200 processes data extracted from or otherwise associated with the message communication(s) to identify the at least one cybersecurity risk. For example, in some embodiments, the apparatus 200 extracts, identifies, and/or otherwise processes particular data associated with each message communication. In some embodiments, the apparatus 200 generates structured log(s) based at least in part on the data from a message communication. The structured log(s) in some embodiments includes a device type that originated the message communication, a type of message communication, a datetime associated with the message communication, payload data associated with the message communication, data indicating an action requested associated with the message communication, and/or the like.

In some embodiments, the apparatus 200 processes the data from the message communication(s) utilizing one or more rule engine(s). In some embodiments, the rule engine(s) are configured based at least in part on a knowledge base including that a data value or combination of data values indicates a particular cybersecurity risk. For example, in some embodiments, the apparatus 200 determines a particular device type and/or configuration of the device of that device type indicates a cybersecurity risk. Alternatively or additionally, in some embodiments, the apparatus 200 determines that a particular network topology including one or more particular device(s), and/or device(s) of particular device type(s) and/or configuration(s), that indicate one or more cybersecurity risk.

Figure 12:
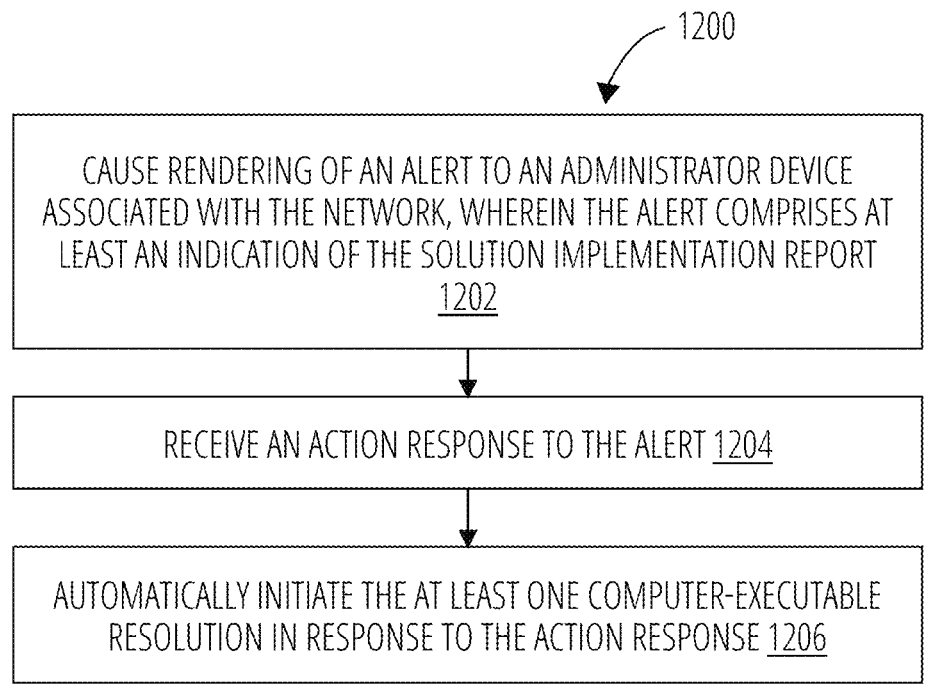
FIG. 12 illustrates a process 1200 embodying a sub-process for managing initiation of an automated healing process for operational technology devices in a network in accordance with one embodiment.

FIG. 12 illustrates a process 1200 embodying a subprocess for managing initiation of an automated healing process for operational technology devices in a network in accordance with one embodiment. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication separate component(s) of an industrial plant or system, device(s) connected to a network, and/or the like. For purposes of simplifying the description, the process 1200 is described as performed by and from the perspective of the apparatus 200.

The process 1200 begins at operation 1202. In some embodiments, the process 1200 begins after one or more operations depicted and/or described with respect to any of the other processes described herein. For example, in some embodiments as depicted, the process 1200 begins before and/or at execution of operation 810. In this regard, some or all of the process 1200 may replace or supplement one or more blocks depicted and/or described with respect to any of the other processes described herein. For example, in some embodiments as depicted, the process 1200 supplants, supplements, and/or otherwise replaces an operation of the process 800, such as operation 810. Additionally or alternatively, as depicted, upon completion of the process 1200, flow may return to one or more operations of another process. For example, as depicted, flow may return optional operation 812 as depicted and described.

According to some examples, the method includes causing rendering of an alert to an administrator device associated with the network, wherein the alert comprises at least an indication of the solution implementation report at operation 1202. The alert includes at least an indication of the solution implementation report. In some embodiments, the apparatus 200 transmits one or more message communication(s) to the administrator device via the network. In some such embodiments such message communication(s) is/are processed by the administrator device to render a particular user interface, for example comprising or embodied by a web page rendered via a browser application, a native application on the administrator device, a push notification, and/or the like that is viewable via the administrator device. In some embodiments, the apparatus 200 identifies predetermined data identifying the administrator device for communication. Additionally or alternatively, in some embodiments, the apparatus 200 identifies user input representing the administrator device. The administrator device may render the user interface via a display of or otherwise communicatively coupled with the administrator device, for example a monitor, integrated touch-adaptive display, and/or the like. In some embodiments, the alert is rendered together with one or more particular interface element(s), for example a first interface element for indicating authorization of a computer-executable resolution and/or a second interface element for indicating rejection of the computer-executable resolution. Additionally or alternatively, in some embodiments, the alert includes description data corresponding to each computer-executable resolution, for example that indicates action(s) to be performed via the computer-executable resolution.

According to some examples, the method includes receiving an action response to the alert at operation 1204. In some embodiments, the action response includes data indicating authorization or rejection of initiation of the at least one computer-executable resolution. In some embodiments, the action response comprises a message communication including or embodying user input that authorizes or rejects initiation of the at least one computer-executable resolution. In some embodiments, the administrator device generates the message communication embodying or including the action response in response to user input, for example by an administrator user, that was inputted via a particular interface element utilizing the administrator device. It will be appreciated that an action response in some embodiments corresponds to a particular computer-executable resolution, or in some embodiments the action response corresponds to a plurality of computer-executable resolutions (e.g., batch authorization or rejection of computer-executable resolutions).

According to some examples, the method includes automatically initiate the at least one computer-executable resolution in response to the action response at operation 1206. In some such embodiments, the apparatus 200 initiates the at least one computer-executable resolution in a circumstance where the action response represents an authorization of the at least one computer-executable resolution. In some embodiments, the apparatus 200 stores a data record indicating that the at least one computer-executable resolution was authorized. In some embodiments, the apparatus 200 initiates the at least one computer-executable resolution on at least one device connected to the network. For example, in some embodiments, the apparatus 200 transmits the computer-executable resolution, and/or message communication(s) including or that enable execution of the same, to a particular device connected to the network. In some such embodiments, the apparatus 200 automatically initiates the at least one computer-executable resolution by transmitting data to the OT device connected on the network, or another detected device connected to the network, that is detected as vulnerable to or contributing to vulnerability to the at least one cybersecurity risk as described herein.

Figure 13:
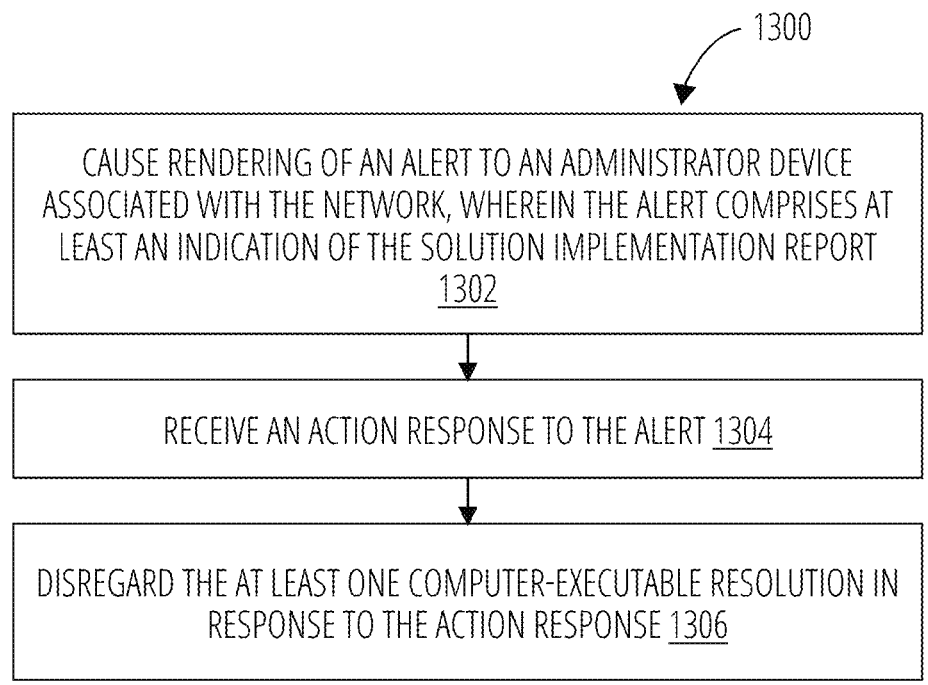
FIG. 13 illustrates a process 1300 embodying a sub-process for managing initiation of an automated healing process for operational technology devices in a network in accordance with one embodiment.

FIG. 13 illustrates a process 1300 embodying a sub-process for managing initiation of an automated healing process for operational technology devices in a network in accordance with one embodiment. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication separate component(s) of an industrial plant or system, device(s) connected to a network, and/or the like. For purposes of simplifying the description, the process 1300 is described as performed by and from the perspective of the apparatus 200.

The process 1300 begins at operation 1302. In some embodiments, the process 1300 begins after one or more operations depicted and/or described with respect to any of the other processes described herein. For example, in some embodiments as depicted, the process 1300 begins after execution of operation 810. In this regard, some or all of the process 1300 may replace or supplement one or more blocks depicted and/or described with respect to any of the other processes described herein. Additionally or alternatively, as depicted, upon completion of the process 1300, flow may return to one or more operations of another process. For example, as depicted, flow may return optional operation 812 as depicted and described.

According to some examples, the method includes causing rendering of an alert to an administrator device associated with the network at operation 1302. The alert includes at least an indication of the solution implementation report. In some embodiments, the apparatus 200 transmits one or more message communication(s) to the administrator device via the network. In some such embodiments such message communication(s) is/are processed by the administrator device to render a particular user interface, for example comprising or embodied by a web page rendered via a browser application, a native application on the administrator device, a push notification, and/or the like that is viewable via the administrator device. In some embodiments, the apparatus 200 identifies pre-determined data identifying the administrator device for communication. Additionally or alternatively, in some embodiments, the apparatus 200 identifies user input representing the administrator device. The administrator device may render the user interface via a display of or otherwise communicatively coupled with the administrator device, for example a monitor, integrated touch-adaptive display, and/or the like. In some embodiments, the alert is rendered together with one or more particular interface element(s), for example a first interface element for indicating authorization of a computer-executable resolution and/or a second interface element for indicating rejection of the computer-executable resolution. Additionally or alternatively, in some embodiments, the alert includes description data corresponding to each computer-executable resolution, for example that indicates action(s) to be performed via the computer-executable resolution.

According to some examples, the method includes receiving an action response to the alert at operation 1304. In some embodiments, the action response includes data indicating authorization or rejection of initiation of the at least one computer-executable resolution. In some embodiments, the action response comprises a message communication including or embodying user input that authorizes or rejects initiation of the at least one computer-executable resolution. In some embodiments, the administrator device generates the message communication embodying or including the action response in response to user input, for example by an administrator user, that was inputted via a particular interface element utilizing the administrator device. It will be appreciated that an action response in some embodiments corresponds to a particular computer-executable resolution, or in some embodiments the action response corresponds to a plurality of computer-executable resolutions (e.g., batch authorization or rejection of computer-executable resolutions).

According to some examples, the method includes disregarding the at least one computer-executable resolution in response to the action response at operation 1306. In some such embodiments, the apparatus 200 disregards the at least one computer-executable resolution in a circumstance where the action response represents a rejection of the at least one computer-executable resolution. In some embodiments, the apparatus 200 stores a data record indicating that the at least one computer-executable resolution was rejected. In some embodiments, the apparatus 200 does not initiate or otherwise execute the at least one computer-executable resolution in response to the action response.

Figure 14:
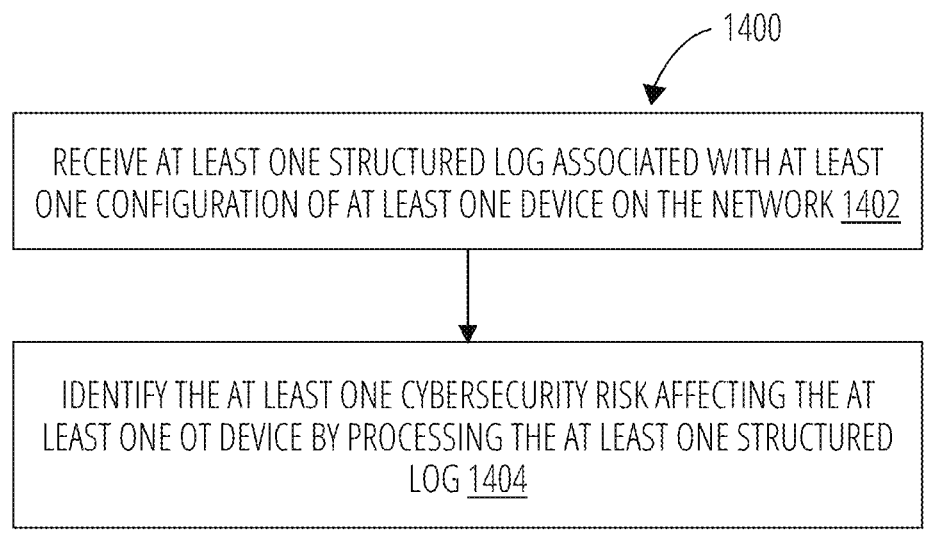
FIG. 14 illustrates a process 1400 embodying a sub-process for managing initiation of an automated healing process for operational technology devices in a network in accordance with one embodiment.

FIG. 14 illustrates a process 1400 embodying a sub-process for managing initiation of an automated healing process for operational technology devices in a network in accordance with one embodiment. Specifically, FIG. 14 depicts operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication separate component(s) of an industrial plant or system, device(s) connected to a network, and/or the like. For purposes of simplifying the description, the process 1400 is described as performed by and from the perspective of the apparatus 200.

The process 1400 begins at operation 1402. In some embodiments, the process 1400 begins after one or more operations depicted and/or described with respect to any of the other processes described herein. For example, in some embodiments as depicted, the process 1400 begins before and/or at execution of operation 802. In this regard, some or all of the process 1400 may replace or supplement one or more blocks depicted and/or described with respect to any of the other processes described herein. Additionally or alternatively, as depicted, upon completion of the process 1400, flow may return to one or more operations of another process. For example, as depicted, flow may return to operation 802 as depicted and described.

According to some examples, the method includes receiving at least one structured log associated with at least one configuration of at least one device on the network at operation 1402. In some embodiments, the at least one structured log includes data representing a value for one or more setting(s) of the device, an application executing thereon, and/or the like. Additionally or alternatively, in some embodiments, the structured log includes metric data associated with operation of the network and/or particular device(s) connected thereto. In some embodiments, the apparatus 200 receives the at least one structured log corresponding to the OT device detected or otherwise identified as connected to the network. In some embodiments, the at least one structured log is received by retrieving such structured log(s) from a repository accessible to the apparatus 200. Additionally or alternatively, in some embodiments, the apparatus 200 receives the at least one structured log by extracting data embodying at least a portion of the structured log(s) from message communication(s) transmitted over the network.

According to some examples, the method includes identifying the at least one cybersecurity risk affecting the at least one OT device by processing the at least one structured log at operation 1404. In some embodiments, the apparatus 200 processes the at least one structured log utilizing one or more rule engine(s). The rule engine(s) in some embodiments includes at least one machine learning model, algorithm, and/or other data-driven determination that data of a particular structured log, or combination of structured logs, indicates a particular cybersecurity risk or plurality of cybersecurity risks. For example, in some embodiments, the apparatus 200 detects anomaly traffic, anomaly behavior in the network and/or operation of one or more device connected to the network, and/or the like, by processing the structured log(s). In some embodiments, the apparatus 200 processes the structured log(s) with expected data value(s) of the data properties in the structured log(s), for example utilizing one or more rule engine(s), to detect data trend(s), pattern(s), and/or deviation(s) that indicate the at least one cybersecurity risk. In some embodiments, the apparatus 200 compares the at least one structured log with baseline configuration data to determine the at least one cybersecurity risk, for example based at least in part on detected deviation(s) from the baseline configuration data. For example, in some embodiments, the structured log(s) is/are processed to detect a particular anomaly or risk scenario, such as anomaly traffic, anomaly behavior, presence of malware in the network, and/or the like.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for managing initiation of an automated healing process for operational technology devices in a network comprising:

identifying at least one operational technology (OT) device connected to a network that is vulnerable to at least one cybersecurity risk, wherein the at least one OT device is wirelessly connected to the network;

identifying at least one computer-executable resolution to the at least one cybersecurity risk;

executing a simulation that tests performance of the network with resolution of the at least one cybersecurity risk utilizing the at least one computer-executable resolution, wherein upon being executed the simulation is configured to:

identify a component of the network affected by the resolution of the at least one cybersecurity risk utilizing the at least one computer-executable resolution;

classify the component as a critical component of the
network or a non-critical component of the network;
and
determine whether the at least one computer-executable
resolution affects the component in a critical manner
or a non-critical manner;
generating a solution implementation report based at least
in part on the simulation; and
determining whether to automatically initiate the at least
one computer-executable resolution based at least in
part on the solution implementation report.

2. The computer-implemented method of claim 1, wherein the computer-executable resolution comprises:
updating at least one configuration of one or more device, wherein the one or more device is of the at least one OT device and/or the network, and wherein the configuration is a setting of the one or more device;
updating at least one configuration of the one or more device of the at least one OT device and/or the network, wherein the configuration is a patch version of an application executed by the one or more device;
isolating the one or more device from the network; and/or
removing at least one portion of code from the one or more device.

3. The computer-implemented method of claim 1, wherein determining whether to automatically initiate the at least one computer-executable resolution based at least in part on the solution implementation report comprises:
determining that the solution implementation report indicates that the at least one computer-executable resolution is to be performed, and the computer-implemented method further comprising:
automatically executing the at least one computer-executable resolution.

4. The computer-implemented method of claim 3, further comprising:
in response to automatically executing the at least one computer-executable resolution, automatically generating an alert that indicates performance of the at least one computer-executable resolution; and
transmitting the alert to at least one administrator device.

5. The computer-implemented method of claim 1, wherein determining whether to automatically initiate the at least one computer-executable resolution based at least in part on the solution implementation report:
automatically determining that the solution implementation report indicates that the at least one computer-executable resolution should not be performed, and the computer-implemented method further comprising:
automatically causing rendering of an alert comprising an indication of the at least one computer-executable resolution for manual review.

6. The computer-implemented method of claim 1, wherein identifying the at least one OT device that is vulnerable to the at least one cybersecurity risk comprises:
detecting at least one malicious action attempted via the at least one OT device.

7. The computer-implemented method of claim 1, wherein the computer-implemented method is performed via at least one processor disposed in an L3 layer of the network.

8. The computer-implemented method of claim 1, wherein identifying the at least one OT device that is vulnerable to the at least one cybersecurity risk comprises:
capturing at least one message communication transmitted over the network; and
identifying the at least one cybersecurity risk by processing the at least one message communication.

9. The computer-implemented method of claim 1, wherein determining whether to automatically initiate the at least one computer-executable resolution based at least in part on the solution implementation report comprises:
causing rendering of an alert to an administrator device associated with the network, wherein the alert comprises at least an indication of the solution implementation report;
receiving an action response to the alert; and
automatically initiating the at least one computer-executable resolution in response to the action response.

10. The computer-implemented method of claim 1, wherein determining whether to automatically initiate the at least one computer-executable resolution based at least in part on the solution implementation report comprises:
causing rendering of an alert to an administrator device associated with the network, wherein the alert comprises at least an indication of the solution implementation report;
receiving an action response to the alert; and
disregarding the at least one computer-executable resolution in response to the action response.

11. The computer-implemented method of claim 1, wherein identifying the at least one OT device that is vulnerable to the at least one cybersecurity risk comprises:
receiving at least one structured log associated with at least one configuration of at least one device on the network; and
identifying the at least one cybersecurity risk affecting the at least one OT device by processing the at least one structured log.

12. The computer-implemented method of claim 1, wherein identifying the at least one OT device that is vulnerable to the at least one cybersecurity risk comprises:
detecting at least one incident representing:
attempted unauthorized access to the at least one OT device,
anomaly behavior performed associated with the at least one OT device after the at least one OT device gains access to the network,
anomaly traffic in inbound and/or outbound access to the network,
existence of a connection of at least one untrusted device on the network,
an internal threat to the network, or
malware present in the network.

13. The computer-implemented method of claim 1, further comprising:
monitoring performance of the network after execution of the at least one computer-executable resolution.

14. The computer-implemented method of claim 1, wherein identifying the at least one OT device that is vulnerable to the at least one cybersecurity risk comprises:
detecting at least one incident representing:
attempted unauthorized access to the at least one OT device,
anomaly behavior performed associated with the at least one OT device after the at least one OT device gains access to the network,
anomaly traffic in inbound and/or outbound access to the network,
existence of a connection of at least one untrusted device on the network,
an internal threat to the network, or
malware present in the network.

15. The computer-implemented method of claim 1, wherein determining whether to automatically initiate the at least one computer-executable resolution comprises:

determining that the at least one computer-executable resolution is to be automatically performed, and wherein the computer-implemented method further comprises:

automatically isolating at least a portion of the network, the portion of the network comprising at least the at least one OT device.

16. The computer-implemented method of claim 1, wherein determining whether to automatically initiate the at least one computer-executable resolution comprises:

determining that the at least one computer-executable resolution is not to be automatically performed, and wherein the computer-implemented method further comprises:

automatically causing rendering of an alert to an administrator device associated with the network, wherein the alert comprises at least an indication of the solution implementation report;

receiving an action response to the alert; and isolating at least a portion of the network in response to the action response, the portion of the network comprising at least the at least one OT device.

17. An apparatus comprising at least one processor and at least one non-transitory memory having computer-coded instructions stored thereon that, in execution with the at least one processor, cause the apparatus to:

identify at least one operational technology (OT) device connected to a network that is vulnerable to at least one cybersecurity risk, wherein the at least one OT device is wirelessly connected to the network;

identify at least one computer-executable resolution to the at least one cybersecurity risk;

execute a simulation that tests performance of the network with resolution of the at least one cybersecurity risk utilizing the at least one computer-executable resolution, wherein upon being executed the simulation is configured to:

identify a component of the network affected by the resolution of the at least one cybersecurity risk utilizing the at least one computer-executable resolution;

classify the component as a critical component of the network or a non-critical component of the network; and determine whether the at least one computer-executable resolution affects the component in a critical manner or a non-critical manner;

generate a solution implementation report based at least in part on the simulation; and determine whether to automatically initiate the at least one computer-executable resolution based at least in part on the solution implementation report.

18. The apparatus of claim 17, wherein the apparatus is disposed within an L3 layer of the network.

19. A computer program product comprising at least one non-transitory computer-readable storage medium having computer program code stored thereon that, when executed by at least one processor, configures the processor for:

identifying at least one operational technology (OT) device connected to a network that is vulnerable to at least one cybersecurity risk, wherein the at least one OT device is wirelessly connected to the network;

identifying at least one computer-executable resolution to the at least one cybersecurity risk;

executing a simulation that tests performance of the network with resolution of the at least one cybersecurity risk utilizing the at least one computer-executable resolution, wherein upon being executed the simulation is configured to:

identify a component of the network affected by the resolution of the at least one cybersecurity risk utilizing the at least one computer-executable resolution;

classify the component as a critical component of the network or a non-critical component of the network; and determine whether the at least one computer-executable resolution affects the component in a critical manner or a non-critical manner;

generating a solution implementation report based at least in part on the simulation; and determining whether to automatically initiate the at least one computer-executable resolution based at least in part on the solution implementation report.

* * * * *